(12) United States Patent
Takenaka et al.

(10) Patent No.: US 8,433,910 B2
(45) Date of Patent: Apr. 30, 2013

(54) ELECTRONIC SIGNATURE METHOD, APPARATUS, AND RECORDING MEDIUM HAVING ELECTRONIC SIGNATURE PROGRAM RECORDED THEREON

(75) Inventors: Masahiko Takenaka, Kawasaki (JP); Tetsuya Izu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1134 days.

(21) Appl. No.: 12/356,845

(22) Filed: Jan. 21, 2009

(65) Prior Publication Data

US 2009/0193256 A1 Jul. 30, 2009

(30) Foreign Application Priority Data

Jan. 21, 2008 (JP) .................................. 2008-010418

(51) Int. Cl.
*H04L 9/32* (2006.01)
(52) U.S. Cl.
USPC ........................................................ 713/176
(58) Field of Classification Search .................. None
See application file for complete search history.

(56) References Cited

U.S. PATENT DOCUMENTS 4,995,082 A 2/1991 Schnorr
8,108,906 B2 * 1/2012 Miyazaki et al. ................ 726/2
2004/0255116 A1 12/2004 Hane et al.
2007/0106908 A1 * 5/2007 Miyazaki et al. ............. 713/189

FOREIGN PATENT DOCUMENTS

| JP | 2666191 B | 10/1997 |
| JP | 2004-364070 A | 12/2004 |
| JP | 2006-060722 A | 3/2006 |

OTHER PUBLICATIONS

Johnson et al., "Homomorphic Signature Scheme" Proceedings of the RSA Security Conference Cryptographers Track, Feb. 2002, p. 244-262.*

* cited by examiner

*Primary Examiner* — Nadia Khoshnoodi
(74) *Attorney, Agent, or Firm* — Fujitsu Patent Center

(57) ABSTRACT

A computer divides a target electronic document into a plurality of document segments. Then, the computer generates a signature (s, t) that includes a set of two values having a signature value s forming a signature on the electronic document and a deletion signature value t used for deletion, the signature value s which serves as a body of the signature being formed by a superposition of signature information on the individual document segments. Then, in a case where one of the plurality of document segments obtained by the division is to be extracted, the computer superimposes deletion information of a document segment to be deleted on the deletion signature value t to generate a new signature value t', and produces an updated signature (s, t').

14 Claims, 20 Drawing Sheets

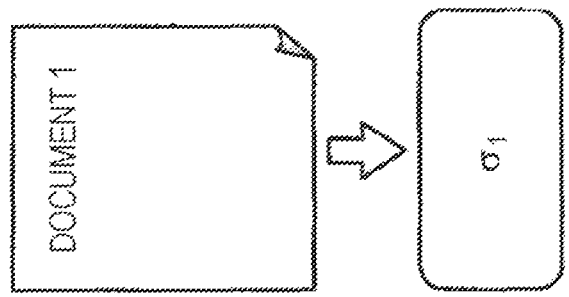
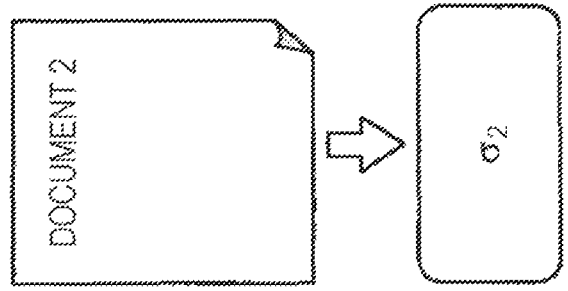
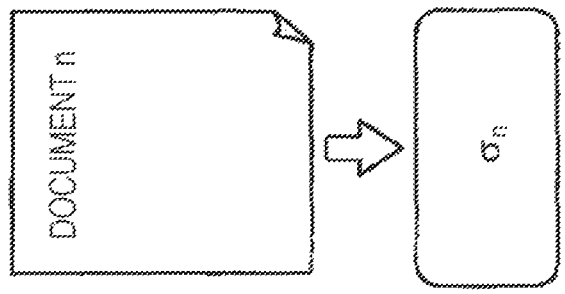
FIG. 4

ELECTRONIC SIGNATURE METHOD, APPARATUS, AND RECORDING MEDIUM HAVING ELECTRONIC SIGNATURE PROGRAM RECORDED THEREON

FIELD

The embodiments relate to an electronic signature technique for ensuring processes for creating or confirming electronic information such as electronic documents, images, and sound.

BACKGROUND

An electronic signature is a technique for verifying the integrity of electronic documents. To assist in the acceleration of the use or utilization of electronic documents, many needs exist for fetching (extraction) of a portion of a signed electronic document. In general electronic signatures, however, such extraction may lead to tampering with the document, and therefore it is difficult to verify integrity. As techniques to solve this problem, applied techniques of partially extractable electronic signatures, called sanitizable signature and deletable signature techniques, are available. Those techniques even allow verification of the integrity of a portion that is extracted.

A general electronic signature is defined by using a two-process model: a signing process for performing signing and a verifying process for performing verification. In an extractable signature scheme, on the other hand, as shown in FIG. 1, a three-process model is used: a signing process for performing signing, an extracting process for extracting a portion from a document signed by the signing process, and a verifying process for verifying the extracted document. The signing process signs a document using a certain method. Then, the extracting process receives the signed document and the signature. The extracting process extracts a portion of the received document, and generates extraction information involved in the extraction or updates the signature. Then, the verifying process receives the extracted document as well as the signature and the extraction information. The verifying process verifies, from the extracted document, the signature and the extraction information, that the extracted document is a portion of the document signed by the signing process. A signature scheme fulfilling the flow described above is defined as an extractable signature scheme.

In a sanitizable signature or deletable signature scheme, a document is divided into a plurality of document segments in advance, and the document segments are signed or are partially signed. In a sanitizable signature or deletable signature scheme of the related art, the amount of signature information may increase in proportion to the number of document segments at the time of signing, or an amount of extraction information proportional to the number of document segments to be extracted or to the number of document segments to be deleted may be required during extraction. Therefore, a large amount of signature information or a large amount of extraction information is required to extract a part of a large size document, resulting in significant inefficiency.

One typical sanitizable signature scheme is a signature scheme (hereinafter referred to as "SUMI-4") disclosed in Japanese Unexamined Patent Application Publication No. 2004-364070. This signature scheme requires only one signature regardless of the number of document segments. However, a group of hash values of document segments to be deleted is required during extraction, and therefore the amount of extraction information increases in proportion to the number of document segments deleted.

This scheme will be described with reference to FIG. 2. At the time of signing, a signing process divides document information M into pieces of document segment information m1 to m4, and adds pieces of document segment ID information ID1 to ID4 to the pieces of document segment information m1 to m4 to generate ID-added document segments M1 to M4. Then, hash values h1 to h4 are calculated. The signing process signs the hash values h1 to h4 (with a signature σ), and forwards ID-added document segments M1 to M4 and the signature σ to an extracting process. During extraction, the extracting process determines an ID-added document segment to be extracted. Here, it is assumed that the ID-added document segment M2 is to be extracted. Then, the extracting process calculates hash values h1, h3, and h4 of the ID-added document segments M1, M3, and M4 to be deleted (not to be extracted), and publishes h1, M2, h3, h4 and the signature σ of the signing process. That is, instead of the ID-added document segments M1, M3, and M4 to be deleted, the hash values h1, h3, and h4 are published. During signature verification, a verifying process calculates a hash value h2 from the published ID-added document segment M2 to recover the hash values h1 to h4 in conjunction with the published hash values h1, h3, and h4 to perform verification using the signature σ. Since the signature σ is a signature added to the hash values h1 to h4 by the signing process, the verifying process can verify that the extracted ID-added document segment M2 is a portion of the document information M signed by the signing process. During extraction, if, instead of an ID-added document segment to be deleted, a hash value thereof is not published, the verifying process is not allowed to perform verification. It is therefore necessary to store an amount of information (hereinafter referred to as "extraction information") proportional to the number of document segments to be deleted, and a problem occurs in that, as the number of ID-added document segments to be deleted increases, the amount of extraction information to be stored also increases.

Another example of a deletable signature scheme of the related art is a signature scheme (hereinafter referred to as "SUMI-6") disclosed in Japanese Unexamined Patent Application Publication No. 2006-60722. This signature scheme requires, during signing, partial signatures to be attached to individual document segments and an entire signature which is a superposition of the partial signatures. Thus, a problem occurs in that the amount of signature information increases in proportion to the number of document segments.

A description will be given with reference to FIG. 3. As in FIG. 2, during signing, a signing process divides document information M into pieces of document segment information m1 to m4, and adds pieces of document segment ID information ID1 to ID4 to the pieces of document segment information m1 to m4 to generate ID-added document segments M1 to M4. Then, the signing process calculates hash values h1 to h4, calculates partial signatures σ1 to σ4 using an aggregate signature technique described below, and superimposes the partial signatures σ1 to σ4 to create an entire signature σ. Finally, the signing process forwards the ID-added document segments M1 to M4, the partial signatures σ1 to σ4, and the entire signature σ to an extracting process. During extraction, the extracting process determines an ID-added document segment to be extracted. Here, it is assumed that the ID-added document segment M2 is to be extracted. The extracting process deletes the ID-added document segments M1, M3, and M4 not to be extracted, and utilizes the corresponding partial signatures σ1, σ3, and σ4 to delete information regarding the partial signatures σ1, σ3, and σ4 from the entire signature σ to produce an updated entire signature σ'. Finally, the extracting process publishes the extracted ID-added document segment M2, the partial signature σ2 thereof, and the updated entire signature σ'. During signature verification, a verifying process performs verification using the published ID-added document segment M2 and the updated entire signature σ'. Since the signature σ' is a signature obtained by deleting information regarding the partial signatures σ1, σ3, and σ4 of the ID-added document segments M1, M3, and M4 deleted by the extracting process from the entire signature σ of the signing process, the verifying process can verify that the extracted ID-added document segment M2 is a portion of the document information M signed by the signing process.

In this scheme, when signing is to be performed, extraction is not performed if partial signature information is not added. It is therefore necessary to store an amount of signature information proportional to the number of document segments to be signed, and a problem occurs in that, as the number of ID-added document segments to be signed increases, the amount of signature information to be stored also increases.

In other words, in sanitizable-signature-based extraction, only one signature (the amount of data is small) is required during signing. During extraction, however, an amount of extraction information corresponding to the number of document segments to be deleted is required in addition to the signature required during signing (the amount of data is large). In deletable-signature-based extraction, a problem arises in that although an extracted document, a signature specific thereto, and an updated entire signature are only required during extraction (the amount of data is small); whereas during signing, an amount of information (specific signature) corresponding to the number of document segments is required in addition to the signature (entire signature) (the amount of data is large).

Another applied technique of electronic signature called aggregate signature technique exists. The aggregate signature technique has attracted attention as a technique capable of reducing the amount of signature data by superimposing signatures in a case where one or a plurality of documents are signed by one or a plurality of signing processes in the distribution of electronic documents or the like.

Typical features of the aggregate signature scheme will now be described. When a plurality of documents are signed by a plurality of persons, if an ordinary electronic signature scheme is employed, as shown in FIG. 4, a number of signature data items corresponding to the number of documents is required. If the aggregate signature scheme is employed, on the other hand, as shown in FIG. 5, signatures of the individual documents can be superimposed (or aggregated) into one signature and the individual documents can be aggregate verified with one signature, and a reduction in the amount of signature data is achieved.

Currently, two aggregate signature construction methods are available: a sequential aggregate signature scheme based on a Rivest-Shamir-Adlema (RSA) signature, which is described in A. Lysyanskaya, et. al., "Sequential Aggregate Signatures from Trapdoor Permutations," EUROCRYPT 2004, LNCS 3027, pp. 74-90, 2004; and a general aggregate signature scheme based on an elliptic curve cryptosystem called pairing, which is described in D. Boneh, et. al., "Aggregate and Verifiably Encrypted Signatures from Bilinear Maps," EUROCRYPT 2003, LNCS 2656, pp. 416-432, 2003. The deletable signature scheme described above uses a general aggregate signature scheme.

Japanese Patent No. 2666191 discloses a signature scheme called Schnorr signature scheme in which only portions of a signature can be superimposed. A Schnorr signature is defined as follows.

A prime number p, a generator g thereof, and an order q of the generator g are published as common parameters. A secret-public key pair of a signing process is represented by (sk, pk), where pk=g sk mod p(0<sk<q), and pk is published as a public key of the signing process.

In order to sign a document M to be signed, the signing process generates a random number k (which is kept secret), and a signature σ=(r, s)=(g k mod p, sk×H(r∥M)+k mod q) is calculated, where H(x) denotes a hash value of a value x, and x∥y represents a concatenation of values x and y. During signature verification, a signature is determined to be valid if the value of g s mod p and the value of pk H(r∥M)×r mod p coincide with each other; and a signature is determined to be invalid if they do not coincide with each other.

An superposition of Schnorr signatures will be described with reference to FIG. 6. In the Schnorr signature scheme, a signature value σ is represented by two values such that σ= (r, s). It is assumed that a Schnorr signature on a document A is represented by σA=(rA, sA), and a Schnorr signature on a document B is represented by σB=(rB, sB). In this case, the verification of the document A and the signature σA and the verification of the document B and the signature σB can be individually performed and, in addition, even if s values of each signature are superimposed, the signature can be verified. That is, the signatures of the documents A and B can be verified using the documents A and B and a signature σAB= (rA, rB, sAB), where sAB=sA×sB mod p. Furthermore, signature verification during the superposition determines that a signature is valid if the value of g sAB mod p and the value of pk H(rA∥M)×rA×pk H(rB∥M)×rB mod p coincide with each other; and determine a signature to be invalid if the values do not coincide with each other. In the Schnorr signature scheme, therefore, since s values of a signature can be superimposed, the required amount of signature data can be reduced although the rate of reduction is lower than that of the aggregate signature scheme.

Furthermore, a technique called RSA accumulator is described in J. Benaloh, and M. de Mare, "One-way accumulators: A decentralized alternative to digital signatures," EUROCRYPT '93, LNCS 765, pp. 274-285, Springer-Verlag, 1994. An RSA accumulator is one type of hash function based on the RSA cryptosystem, and has an superimposition function. The product of two prime numbers p and q, N, is used so as to be used in the RSA cryptosystem. A generator g relatively prime to N and the order φ of the generator g, which is given by φ=LCM(p−1)(q−1), are used. The RSA accumulator has a pseudo-commutative property, which is secure under the RSA assumption. The term "pseudo-commutative" means that if the function f: X×Y→X satisfies the property below in all x∈X and all y1 and y2∈Y, then the function f has a pseudo-commutative property:

$$f(f(x,y1),y2)=f(x,y2),y1)$$

That is, in a case where the function f is repeatedly applied many times, the function f has a property that the order of application of the function f is changeable (commutative) with respect to the y values. In an RSA accumulator in the document mentioned above, the function f is implemented by $$fN(x,y)=xH(y) \bmod N,$$

where H denotes a one-way hash function (such as SHA1).

In the RSA accumulator, the relationship $$gH(y1) \times H(y2) \bmod N = (gH(y1) \bmod N)H(y2) \bmod N$$
$$= (gH(y2) \bmod N)H(y1) \bmod N$$

is established. That is, hash values can be superimposed in random order. In addition, since the RSA accumulator has a one-way property, it is difficult to calculate x values from (g H(y) mod N), H(y), and N (RSA assumption).

SUMMARY

A computer divides a target electronic document into a plurality of document segments.

Then, the computer generates a signature that includes a set of two values having a signature value s forming a signature on the electronic document and a deletion signature value t used for deletion. The signature value s, which serves as a body of the signature, is formed by a superposition of signature information on the individual document segments.

Then, in a case where one of the plurality of document segments obtained by the division is to be extracted, the computer superimposes deletion information of a document segment to be deleted on the deletion signature value t to generate a new signature value t', and produces an updated signature (s, t').

BRIEF DESCRIPTION OF THE DRAWINGS

FIG. 4 is a schematic diagram showing a concept of an ordinary electronic signature;

DESCRIPTION OF EMBODIMENT

A signature scheme of the present embodiment will be described.

[Adoption of RSA Accumulator in Sanitizable Signature Process]

In the present embodiment, first, the adoption of an RSA accumulator in a portion of a sanitizable signature process will be described with reference FIG. 2.

Figure 1:
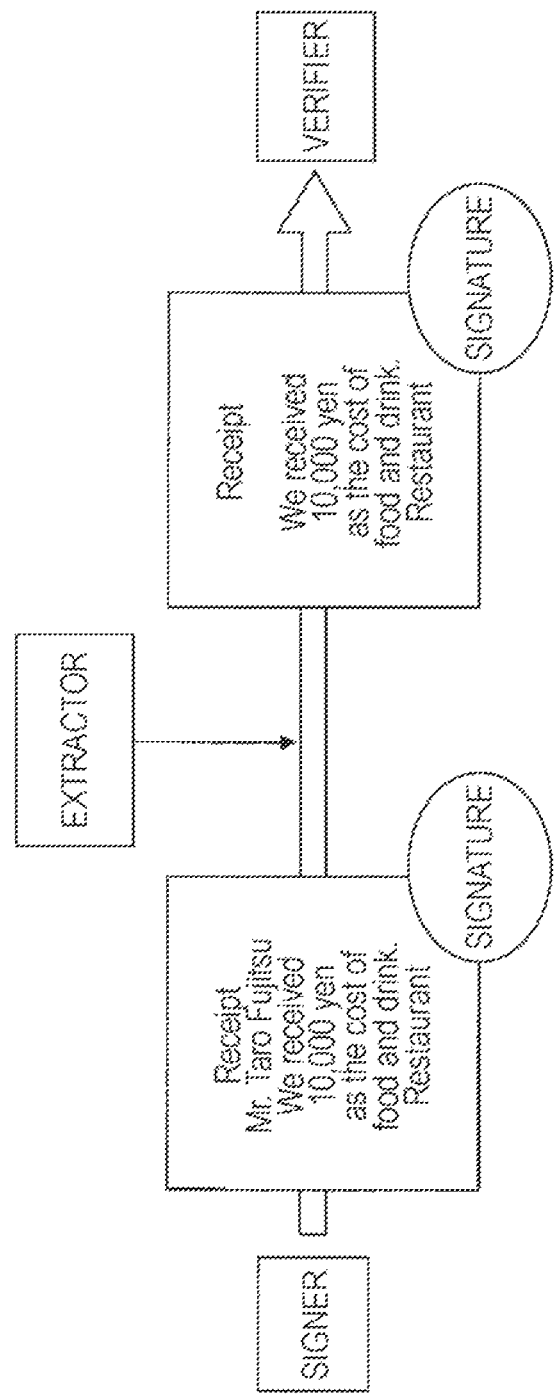
FIG. 1 is a schematic diagram showing a concept of an extractable signature.
Figure 2:
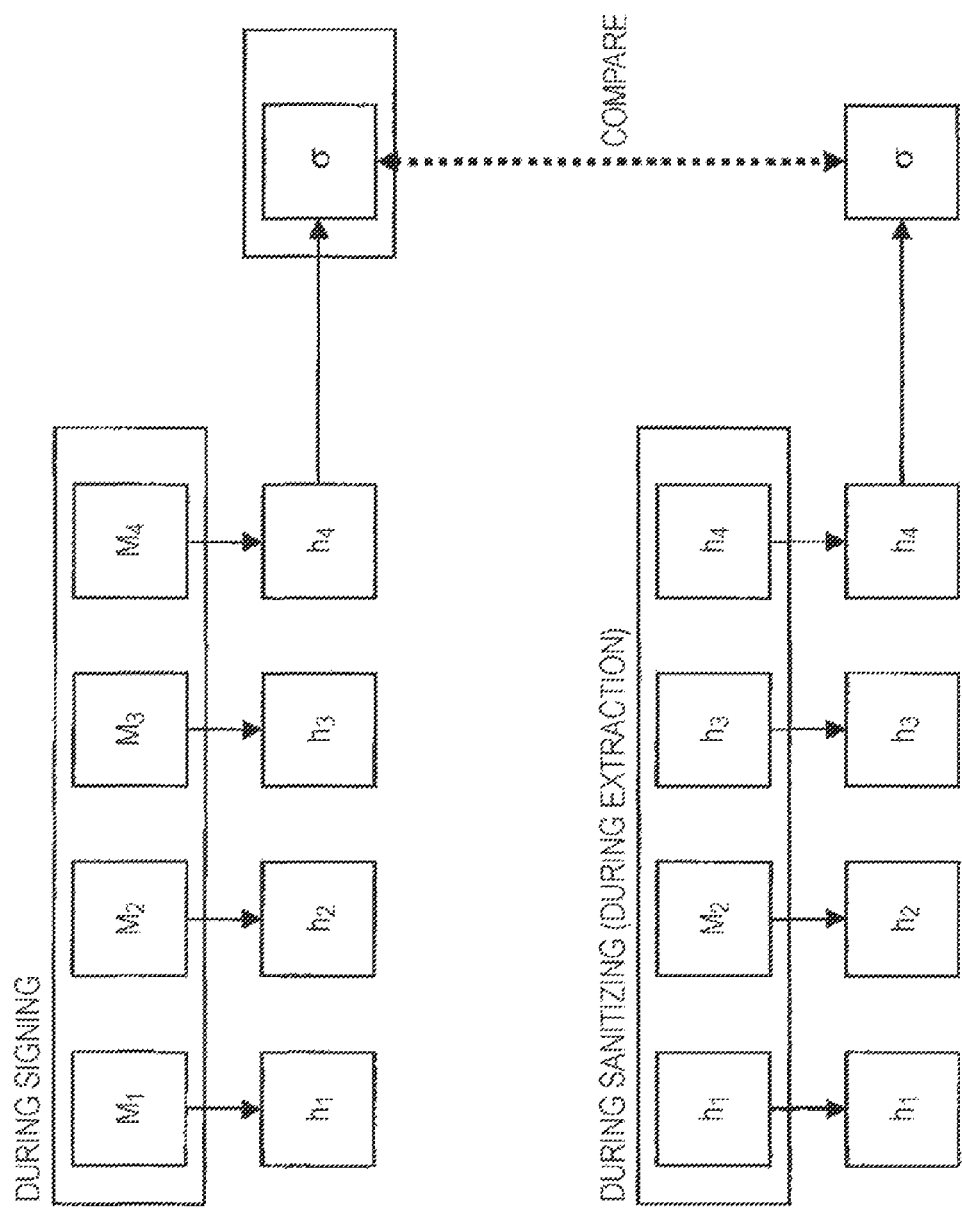
FIG. 2 is a diagram showing a problem with a sanitizable signature scheme of the related art.
Figure 3:
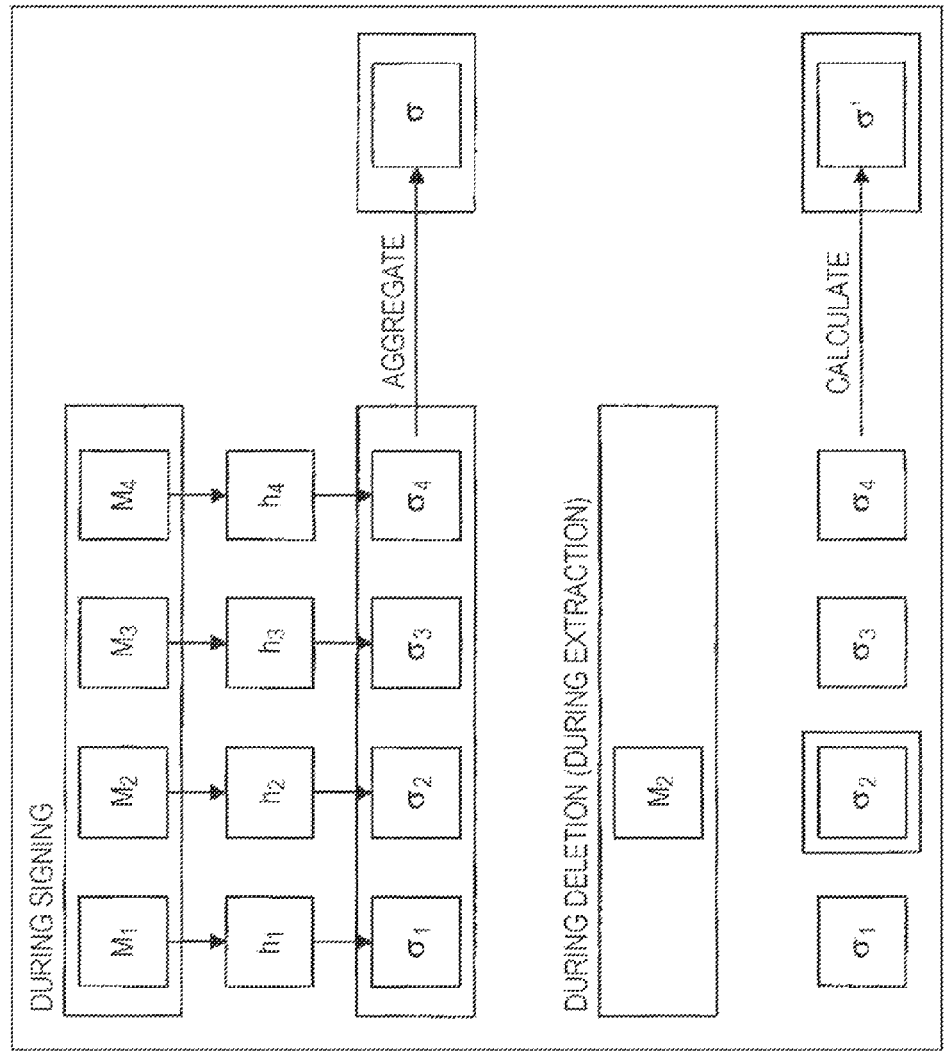
FIG. 3 is a diagram showing a problem with a deletable signature scheme of the related art.
Figure 5:
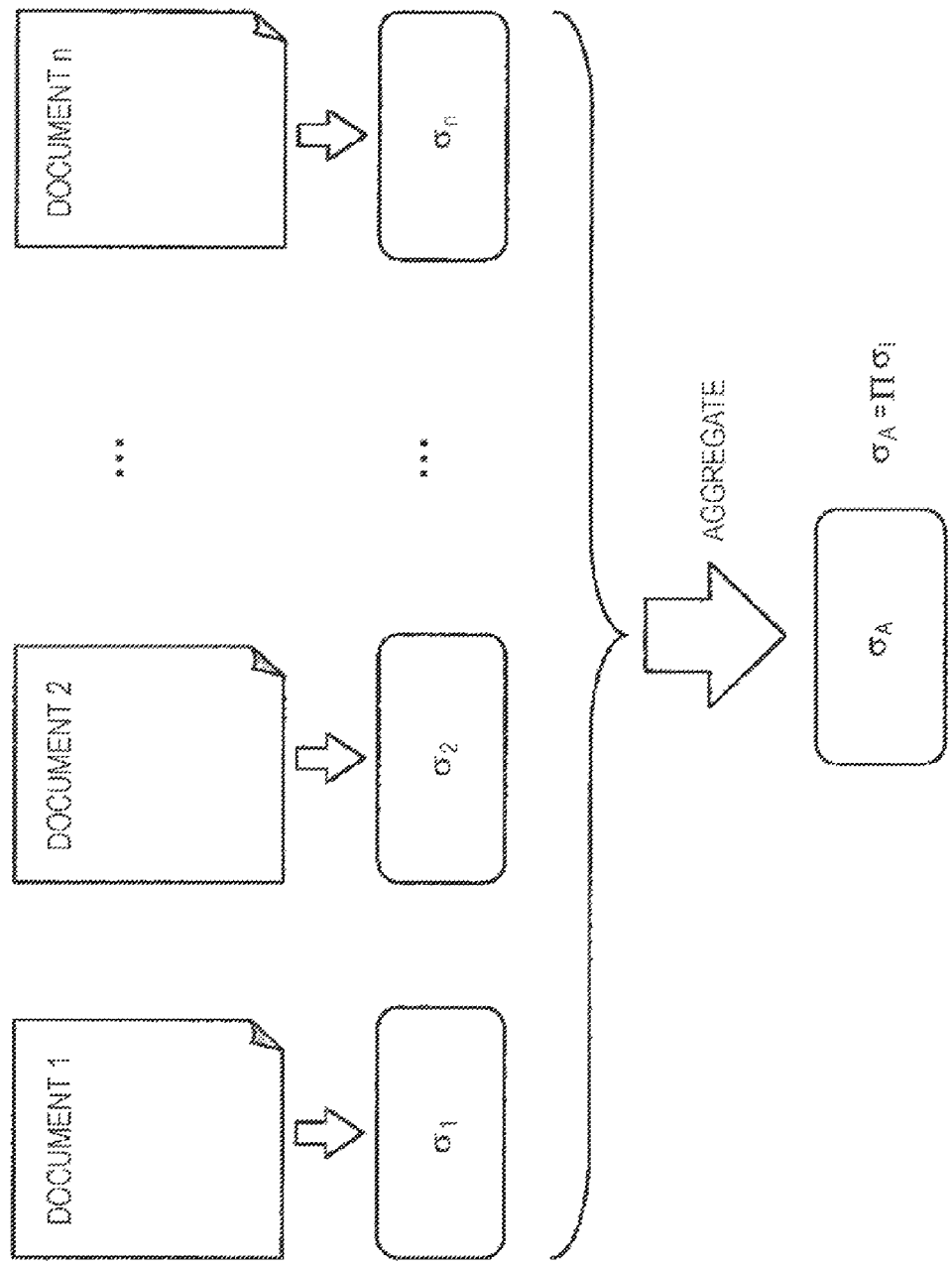
FIG. 5 is a schematic diagram showing a concept of an aggregate signature.
Figure 6:
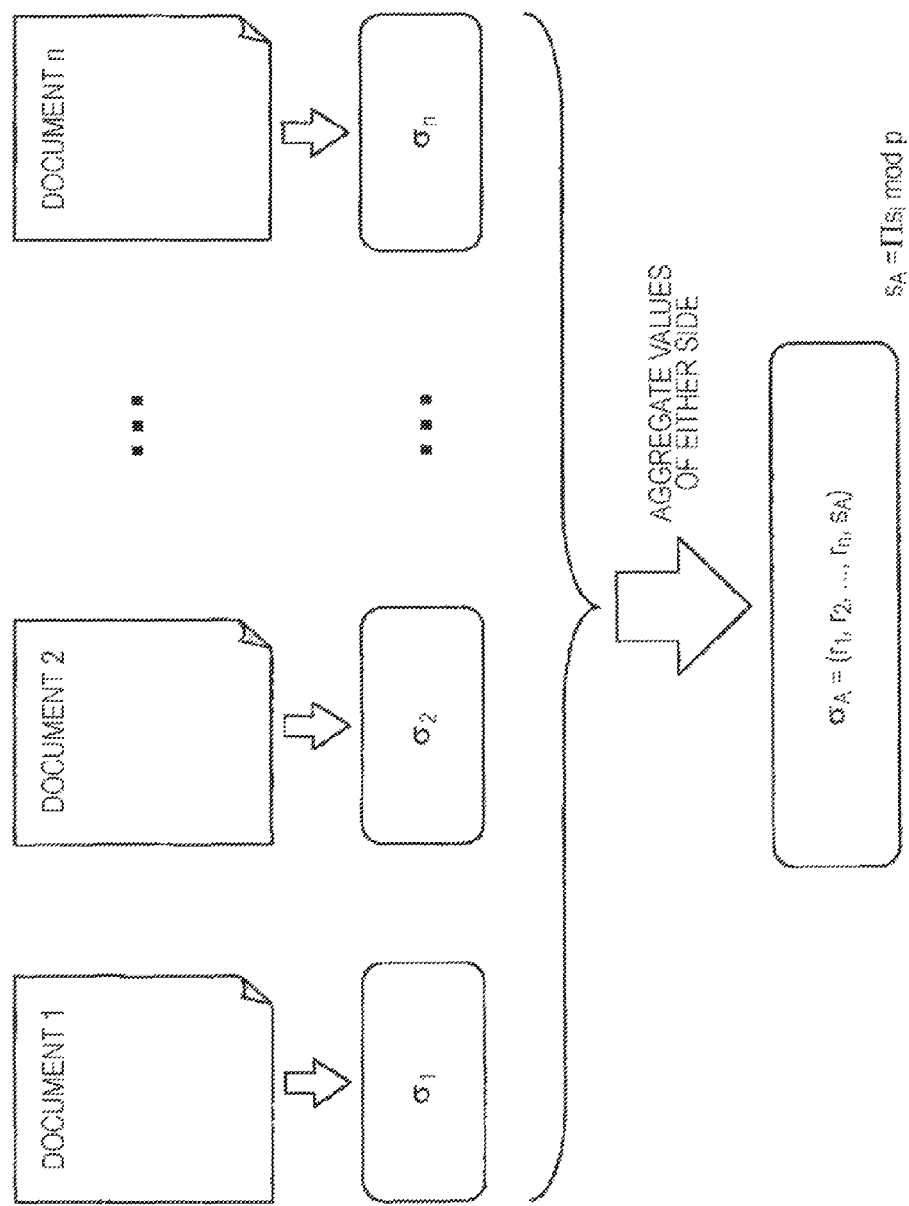
FIG. 6 is a schematic diagram showing a concept of a Schnorr signature.

In the sanitizable signature process shown in FIG. 2, hash values of ID-added document segments are signed. That is, a value h1∥h2∥h3∥h4 (where ∥ represents a concatenation) obtained by concatenating hash values h1 to h4 of ID-added document segments M1 to M4 is signed. It is assumed that the signature is represented by σ=Sign(H(h1∥h2∥h3∥h4)). If a concatenation of hash values is signed, the integrity of all pieces of information regarding the hash values h1 to h4 is guaranteed. However, the H(h1∥h2∥h3∥h4) portion is not pseudo-commutative. Thus, for example, it is difficult to generate H(h1∥h2∥h3∥h4) from H(h1∥h2∥h3) and h4. Signature confirmation requires Verify (σ, H(h1∥h2∥h3∥h4)) and H(h1∥h2∥h3∥h4), and it is difficult to perform signature confirmation from H(h1∥h2∥h3) and h4.

In the present embodiment, therefore, an RSA accumulator is adopted in this portion. Using $g^{h1 \times h2 \times h3 \times h4}$ mod N instead of H(h1∥h2∥h3∥h4), then the signature becomes:

$$\sigma = \text{Sign}(g^{h1 \times h2 \times h3 \times h4} \bmod N).$$

In this case, due to the pseudo-commutative property of the RSA accumulator, the equation $$(g^{h1 \times h2 \times h3} \bmod N)^{h4} \bmod N = g^{h1 \times h2 \times h3 \times h4} \bmod N$$

is obtained. Therefore, it is possible to perform signature confirmation Verify (σ, $g^{h1 \times h2 \times h3 \times h4}$ mod N) from ($g^{h1 \times h2 \times h3}$ mod N) and h4.

[Adoption of Deletion Signature]

If a concatenation of hash values is simply changed to conform to an RSA accumulator, the amount of information is not reduced. In the present embodiment, therefore, a deletion signature used for deletion is adopted to reduce the amount of information. In order to distinguish signatures, a signature on the RSA accumulator is represented by s=Sign($g^{h1 \times h2 \times h3 \times h4}$ mod N). The deletion signature is represented by t. The two signatures s and t are referred to as a signature σ=(s, t).

Figure 7:
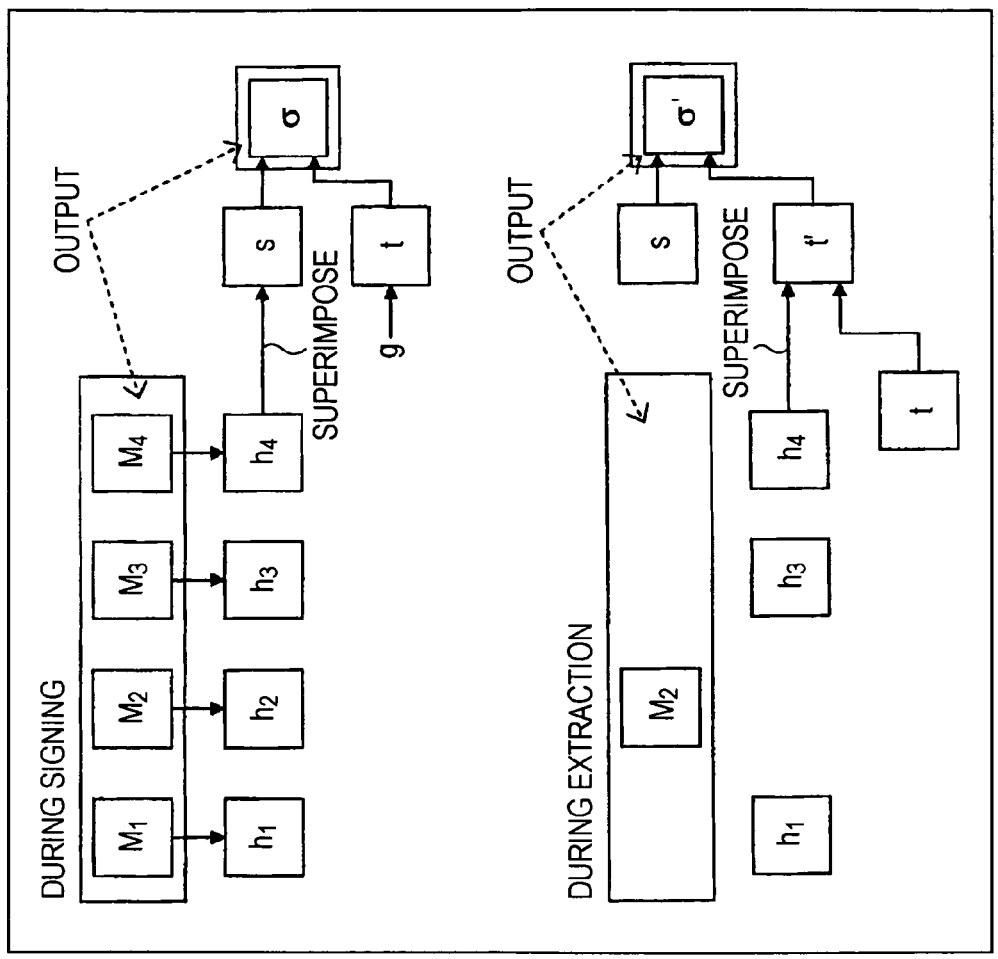
FIG. 7 is a diagram showing a concept of a signature scheme of the present embodiment.

FIG. 7 shows a concept of a signature scheme of the present embodiment.

As in the sanitizable signature shown in FIG. 2, a signing process creates ID-added document segments M1 to M4, and creates individual partial hash values h1 to h4. The hash values h1 to h4 are superimposed using an RSA accumulator to calculate $$s = \text{Sign}(g^{h1 \times h2 \times h3 \times h4} \bmod N).$$

Then, the signing process sets an initial value of the deletion signature t such that t=g, and outputs the signature σ=(s, t).

As in the sanitizable signature shown in FIG. 2, an extracting process calculates hash values h1, h3, and h4 of the ID-added document segments M1, M3, and M4 to be deleted (not to be extracted). Then, the extracting process updates the deletion signature t to t'=$g^{h1 \times h3 \times h4}$ mod N, and publishes the ID-added document segment M2 and an updated signature σ'=(s, t').

A verifying process calculates a hash value h2 from the published ID-added document segment M2, and performs verification by calculating $$\text{Verify}(s, t'^{h2} \bmod N) = \text{Verify}(s, g^{h1 \times h2 \times h3 \times h4} \bmod N)$$

from the updated signature σ'=(s, t') and the hash value h2.

Such superposition on a deletion signature using an RSA accumulator can greatly reduce the amount of storage of hash values during sanitizing, which is a problem with sanitizable signatures.

Any signature algorithm can be used for Sign and Verify. For example, in a case where an RSA signature is used, RSA accumulator parameters (g, N) are necessary in addition to RSA signature parameters (public key, secret key, certificate, etc.).

In the present embodiment, therefore, an extractable signature scheme based on the Schnorr signature scheme, in which an RSA accumulator is further incorporated in the signature algorithm, is formed. With the use of this scheme, a Public Key Infrastructure (PKI) certificate of the standard RSA cryptosystem can be utilized without separately managing parameters for the RSA accumulator.

[Definition of Schnorr Signature Under RSA Assumption]

Next, in the present embodiment, the Schnorr signature scheme is improved to implement a signature scheme capable of superimposing both signature information and extraction information.

First, in the present embodiment, a Schnorr signature is defined under the RSA assumption. A Schnorr signature uses, as common parameters to be published, a prime number p, a generator g thereof, and an order q of the generator g. In the present embodiment, instead of the prime number p, the product N of two prime numbers p and q is used so as to be used in the RSA cryptosystem. Then, a generator g relatively prime to N and the order φ of the generator g, which is given by φ=LCM(p−1)(q−1), are used. Unlike the Schnorr signature scheme, here it is assumed that N and g are not common parameters but are public keys of the signing process. It is further assumed that φ is one of secret keys of the signing process.

Next, a key pair (sk, pk) of the signing process is defined in a manner similar to that of a Schnorr signature. It is assumed that the key pair (sk, pk) is defined by pk=g sk mod N(0<sk<φ) and sk is one of the secret keys of the signing process. In the present embodiment, however, pk may not necessarily be published (pk may need to be published in Schnorr signatures under the RSA assumption. In the present embodiment, which is related to an extractable signature scheme, however, pk may not necessarily be published). In a case where pk is published, it is assumed that pk, together with N and g, is a public key of the signing process. In a case where pk is not published, N and g are two public keys of the signing process.

The signature and signature confirmation algorithms are similar to those in the Schnorr signature scheme.

In order to sign a document M to be signed, the signing process generates a random number k (which is held secret), and a signature $$\sigma = (r, s) = (gk \bmod N, sk \times H(r\|M) + k \bmod \phi)$$

is calculated, where H(x) denotes a hash value of a value x, and x∥y represents a concatenation of values x and y. During signature verification, a signature is determined to be valid if the value of g s mod N and the value of pk H(r∥M)×r mod φ coincide with each other; and a signature is determined to be invalid if the value of g s mod N and the value of pk H(r∥M)×r mod φ do not coincide with each other.

[Overview of Scheme of the Present Embodiment, which is Extension of Schnorr Signature Scheme Under RSA Assumption]

A signature scheme of the present embodiment is defined as an extension of the Schnorr signature scheme under the RSA assumption defined above.

Extensions of the Schnorr signature scheme under the RSA assumption include: (1) the number of signatures is changed from two, namely, (r, s), to three, namely, (r, s, t); (2) n document segments, into which a document M to be signed is divided, are targets to be signed; (3) a signature value r is used as a document ID; (4) signature information of document segments is superimposed on a signature value s, which is a body of the signature; and (5) deletion information (extraction information) is superimposed on the deletion signature value t.

Figure 8:
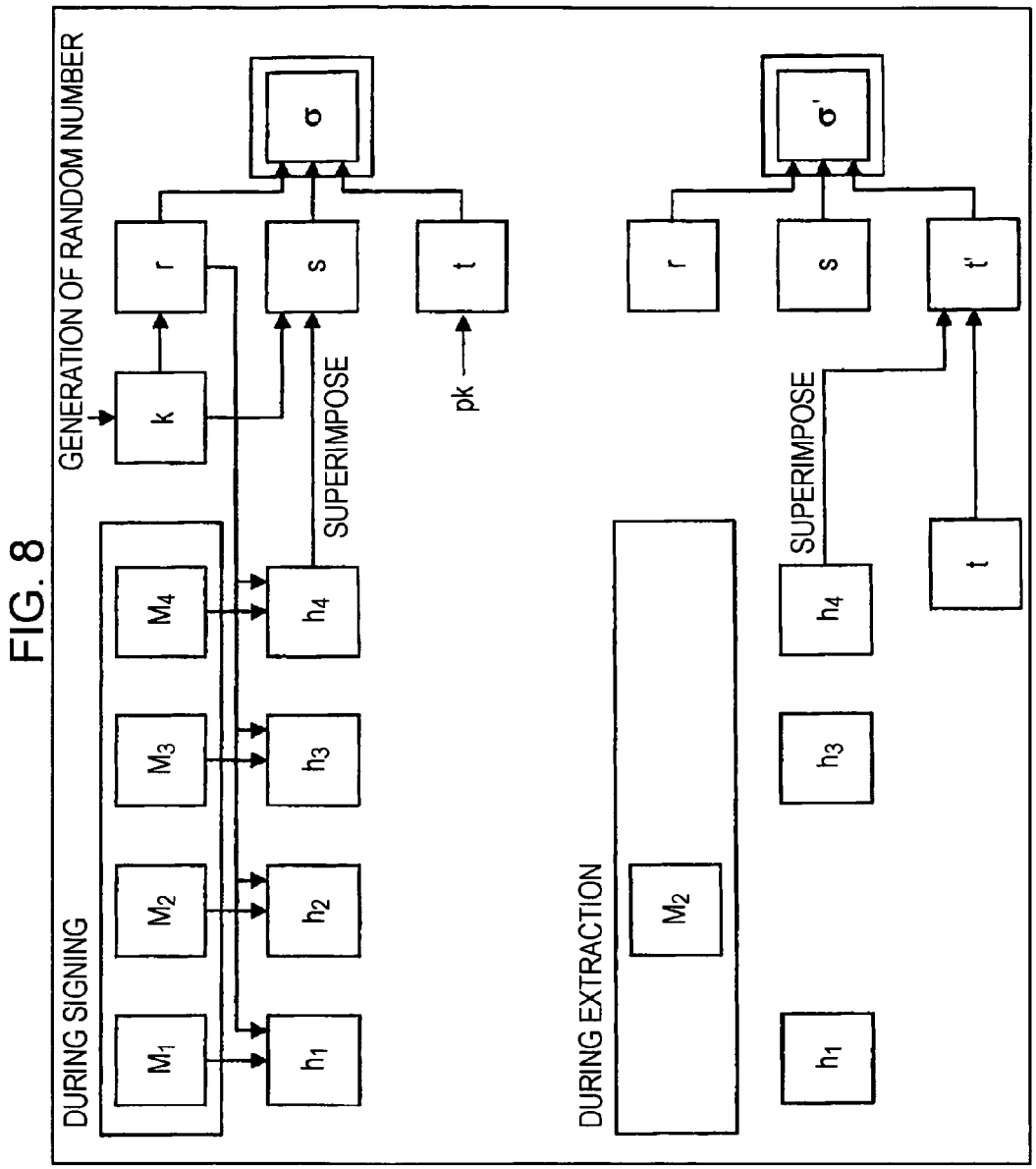
FIG. 8 is a diagram showing an overview of the signature scheme of the present embodiment.

FIG. 8 shows an overview of the signature scheme of the present embodiment. This signature scheme will be specifically described separately with respect to signature generation, extraction, and signature verification.

[Signature Generation]

Figure 9:
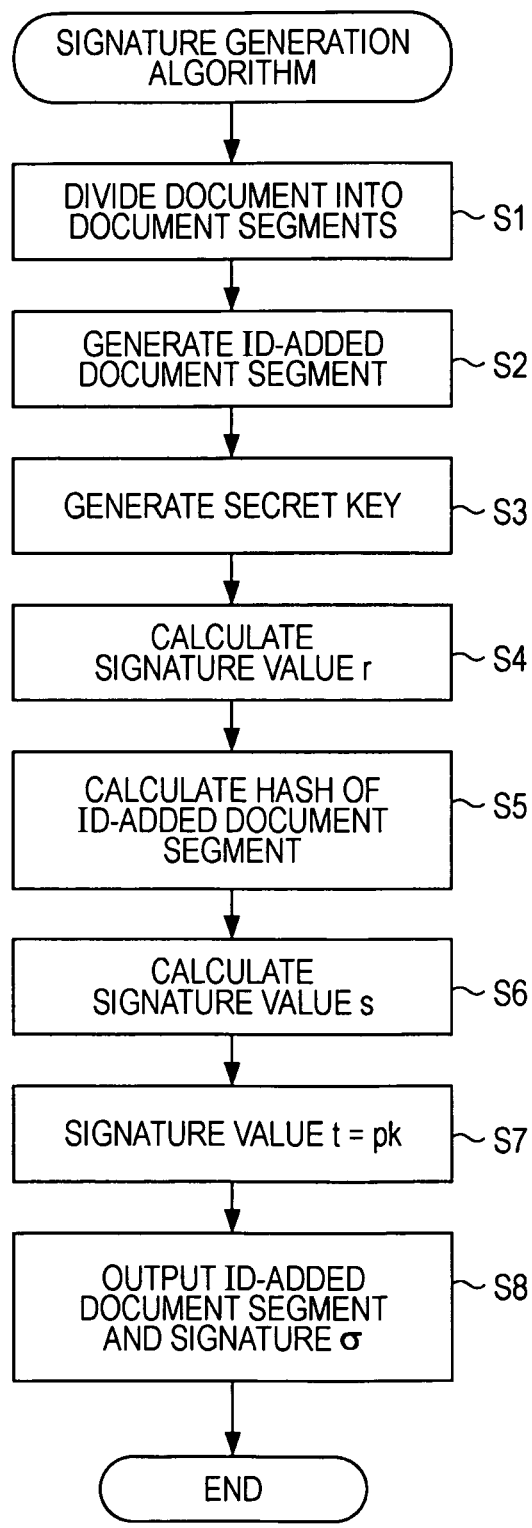
FIG. 9 is a flowchart showing a signature generation algorithm according to the present embodiment.

A signature generation algorithm will now be described with reference to a flowchart shown in FIG. 9. (1) In step S1, the signing process divides a document M into n document segments {mi(0≦i≦n−1)}, and in step S2, the signing process adds document segment IDs {IDi(0≦i≦n−1)} to those document segments to generate ID-added document segments Mi=IDi∥mi(0≦i≦n−1). (2) In step S3, the signing process generates a temporary secret key k using a random number less than φ(0<k<φ). (3) In step S4, the signing process calculates a signature value r=g k mod N as a document ID. (4) In step S5, the signing process calculates a hash value hi=H(r∥Mi) of each ID-added document segment Mi using the signature value r and a hash function. (5) In step S6, the signing process calculates a signature value s=sk× Π0≦i≦n−1 hi+k mod φ, which is a body of the signature. Here, signature information of each document segment is superimposed on the signature value s, which is a body of the signature, in a form of Π0≦i≦n−1 hi. (6) In step S7, the signing process prepares a signature value t for storage of deletion information, and sets an initial value thereof such that t=pk. (7) In step S8, the signing process outputs an ID-added document segment set {Mi(0≦i≦n−1)} and a signature σ=(r, s, t).

Figure 10:
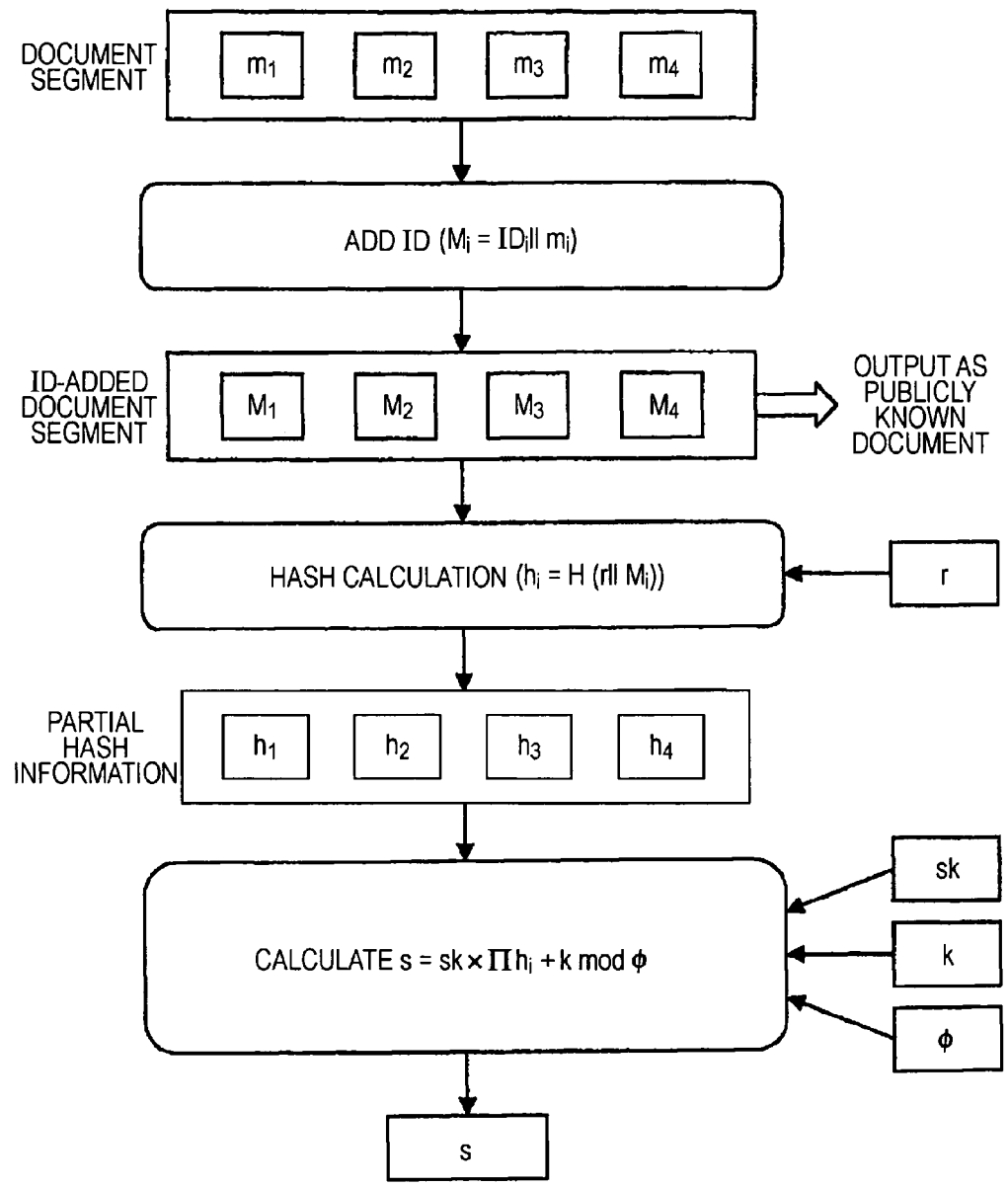
FIG. 10 is a schematic diagram showing a process of generating a signature value s (signature generation flow (s value))
Figure 11:
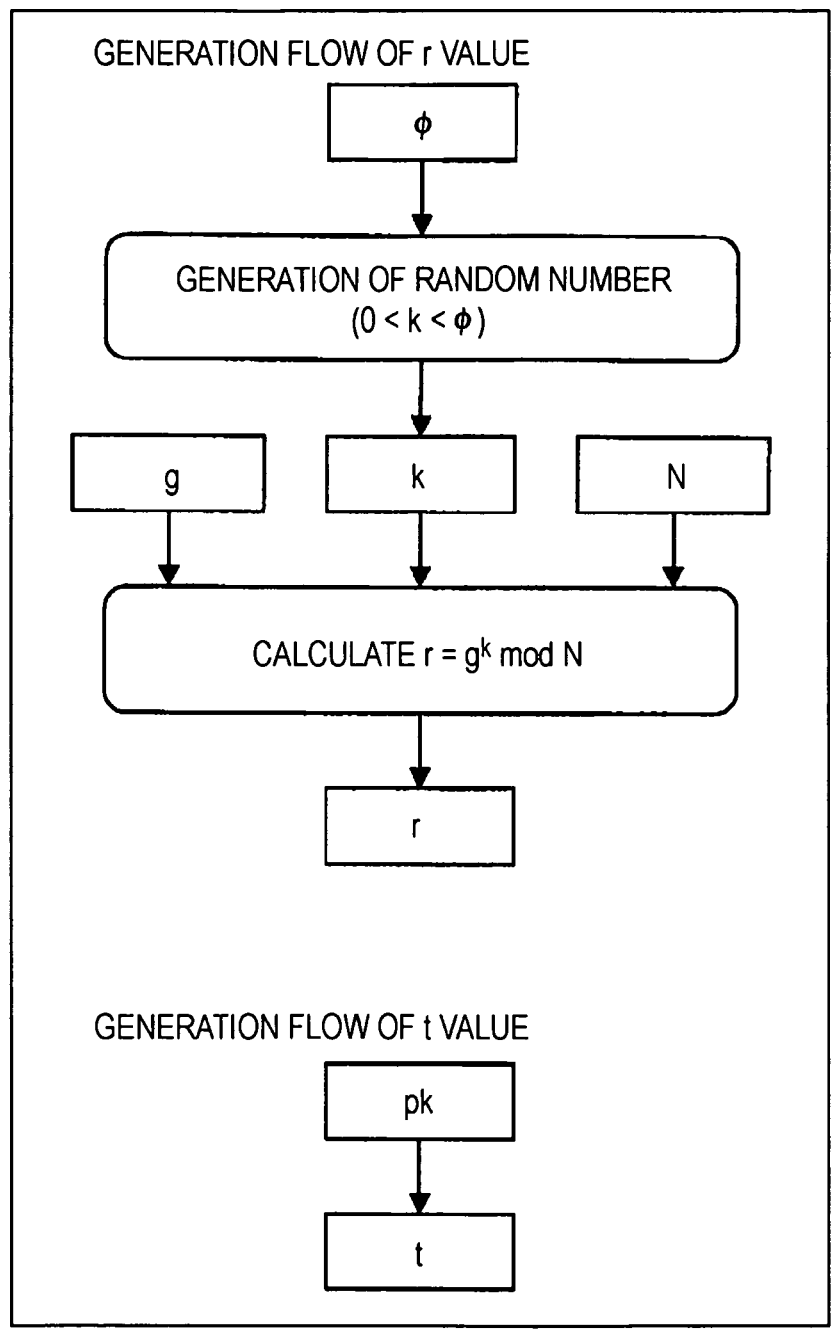
FIG. 11 is a schematic diagram showing a process of generating signature values r and t (signature generation flow (r and t values))

FIG. 10 schematically shows the process of generating the signature value s described above, and FIG. 11 schematically shows the process of generating the signature values r and t.

[Extraction]

Figure 12:
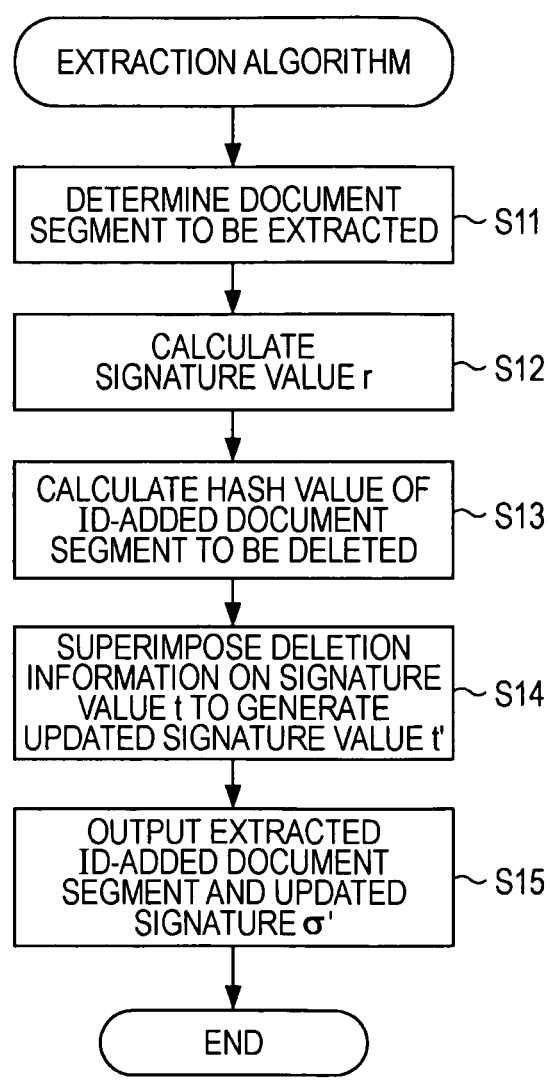
FIG. 12 is a flowchart showing an extraction algorithm according to the present embodiment.

Next, an algorithm for extracting a document segment will be described with reference to a flowchart shown in FIG. 12.

(1) In step S11, first, the extracting process determines an extraction document number set ξ. A document segment M' to be extracted may be represented by M'={Mi(i⊂ξ)}, and a document segment M" to be deleted may be represented by M"={Mi(i⊂ξ̄)}.

(2) In step S12, the extracting process calculates a signature value r. Then, in step S13, the extracting process calculates a hash value {hi=H(r||Mi)(i⊂ξ)} of the document segments {Mi(i⊂ξ)} to be deleted.

(3) Furthermore, in step S14, the extracting process superimposes information regarding the document segment to be deleted on the signature value t to update the signature value t into a signature value t' given by the following equation:

$$t' = t^{\Pi_{i \subset \xi} hi}$$

(4) Then, in step S15, the extracting process outputs the extracted ID-added document segment set {Mi(i⊂ξ)} and the updated signature σ'=(r, s, t').

Figure 13:
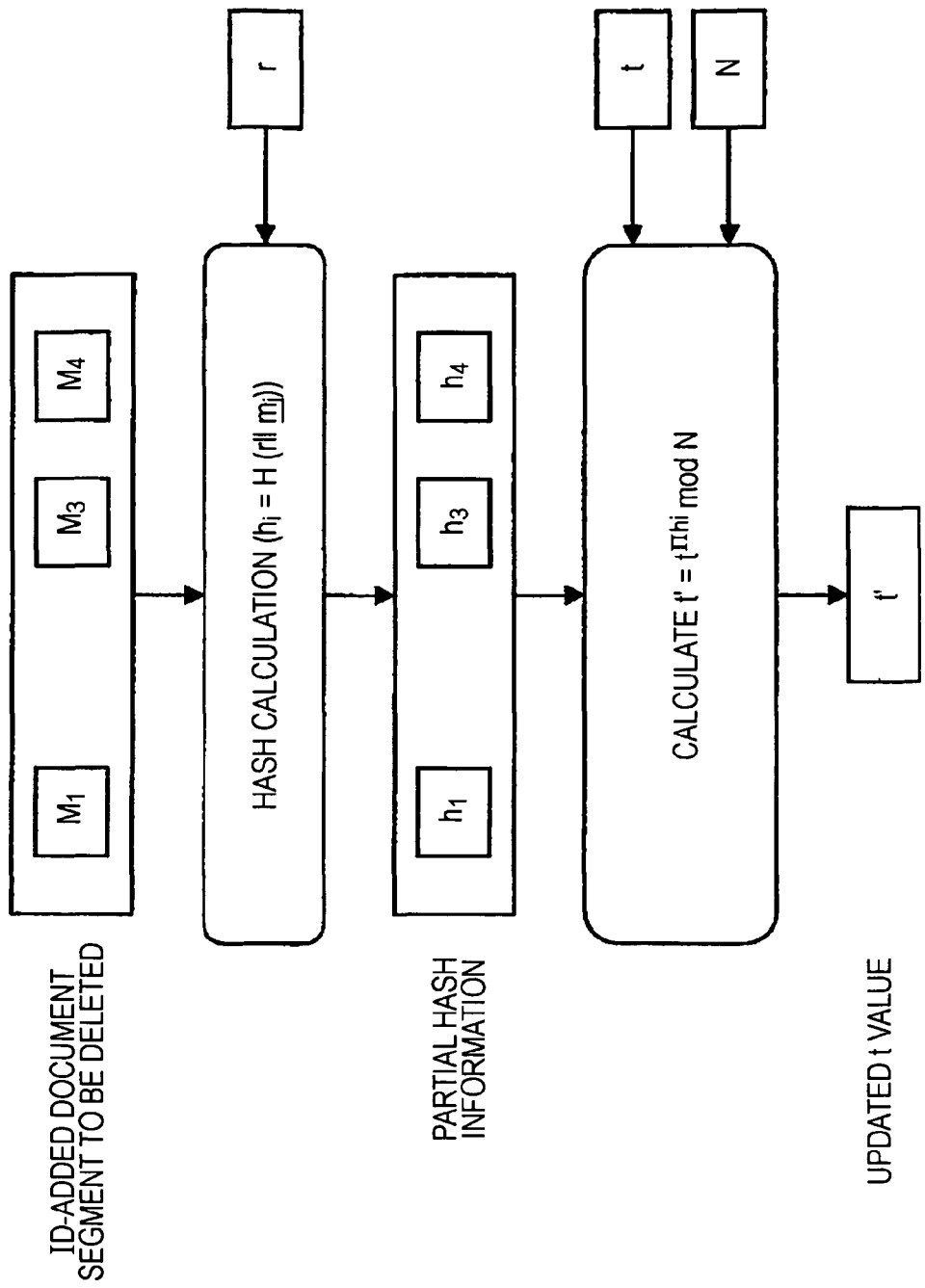
FIG. 13 is a schematic diagram showing a process of updating the signature value t (signature update flow during extraction (t value))

FIG. 13 schematically shows the process of updating the signature value t described above.

[Signature Verification]

Figure 14:
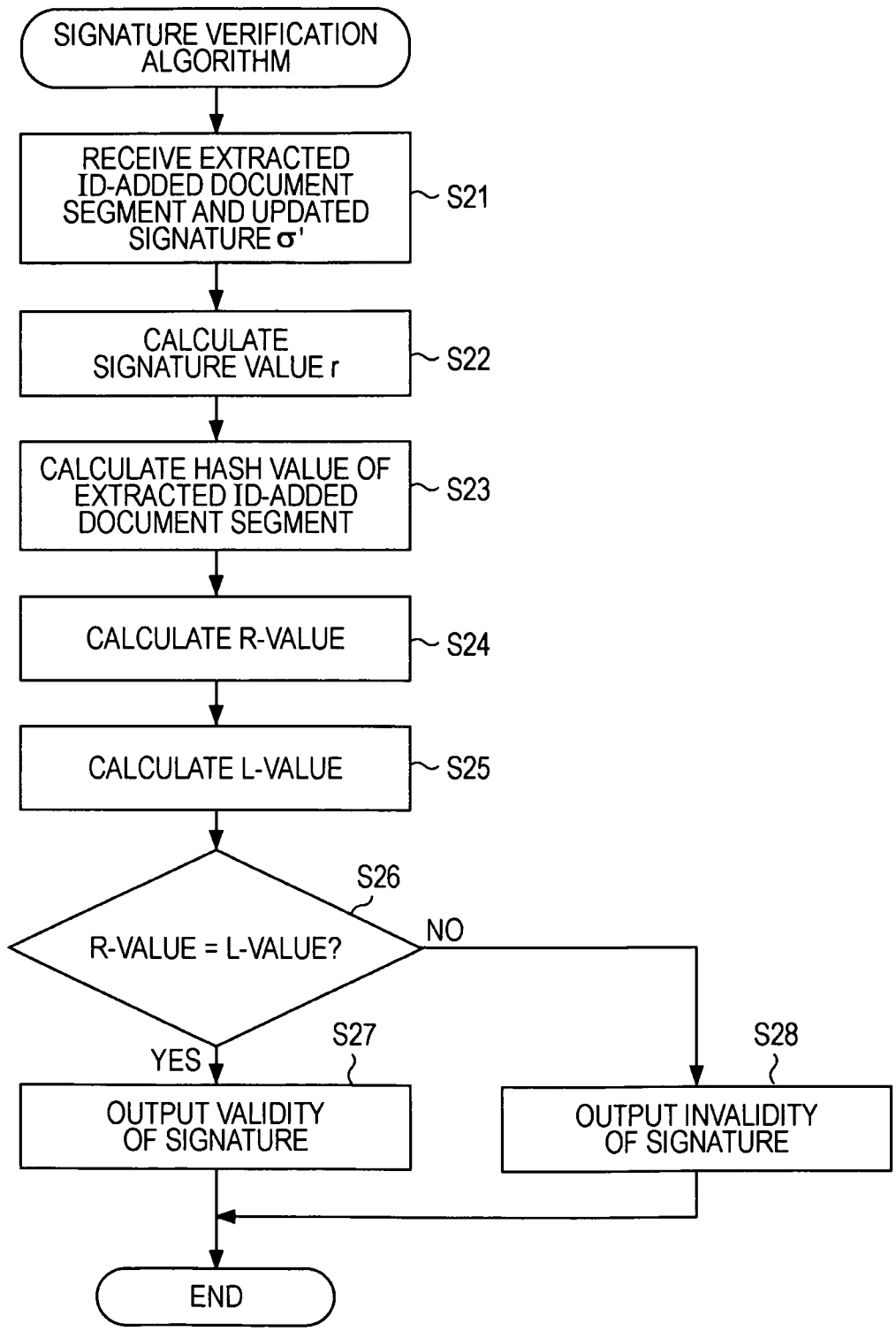
FIG. 14 is a flowchart showing a signature confirmation algorithm according to the present embodiment.

An algorithm for verifying a signature of a document segment will be described with reference to a flowchart shown in FIG. 14.

(1) In step S21, a verifying process receives the extracted ID-added document segments {Mi(i⊂ξ)} and the updated signature σ'=(r, s, t').

(2) In step S22, the confirming process calculates a signature value r. Then, in step S23, the confirming process calculates a hash value {hi=H(r||Mi)(i⊂ξ)} of the extracted ID-added document segment {M(i⊂ξ)}.

(3) In step S24, the confirming process calculates the value of a right-hand side (R-value) given by the equation below from the signature value t', the public key N of the signing process, and the hash value hi:

$$\text{Right-hand side} = t'^{\Pi_{i \subset \xi} hi} \times r \mod N$$

(4) In step S25, the confirming process calculates the value of a left-hand side (L-value), which is given by g s mod N, using the signature value and the public keys g and N of the signing process.

(5) In step S26, the confirming process compares the right-hand side (R-value) with the left-hand side (L-value). If R-value and L-value coincide with each other, then in step S27, the confirming process outputs a result indicating that the signature is valid. If R-value and L-value do not coincide with each other, then in step S28, the confirming process outputs a result indicating that the signature is invalid.

Figure 15:
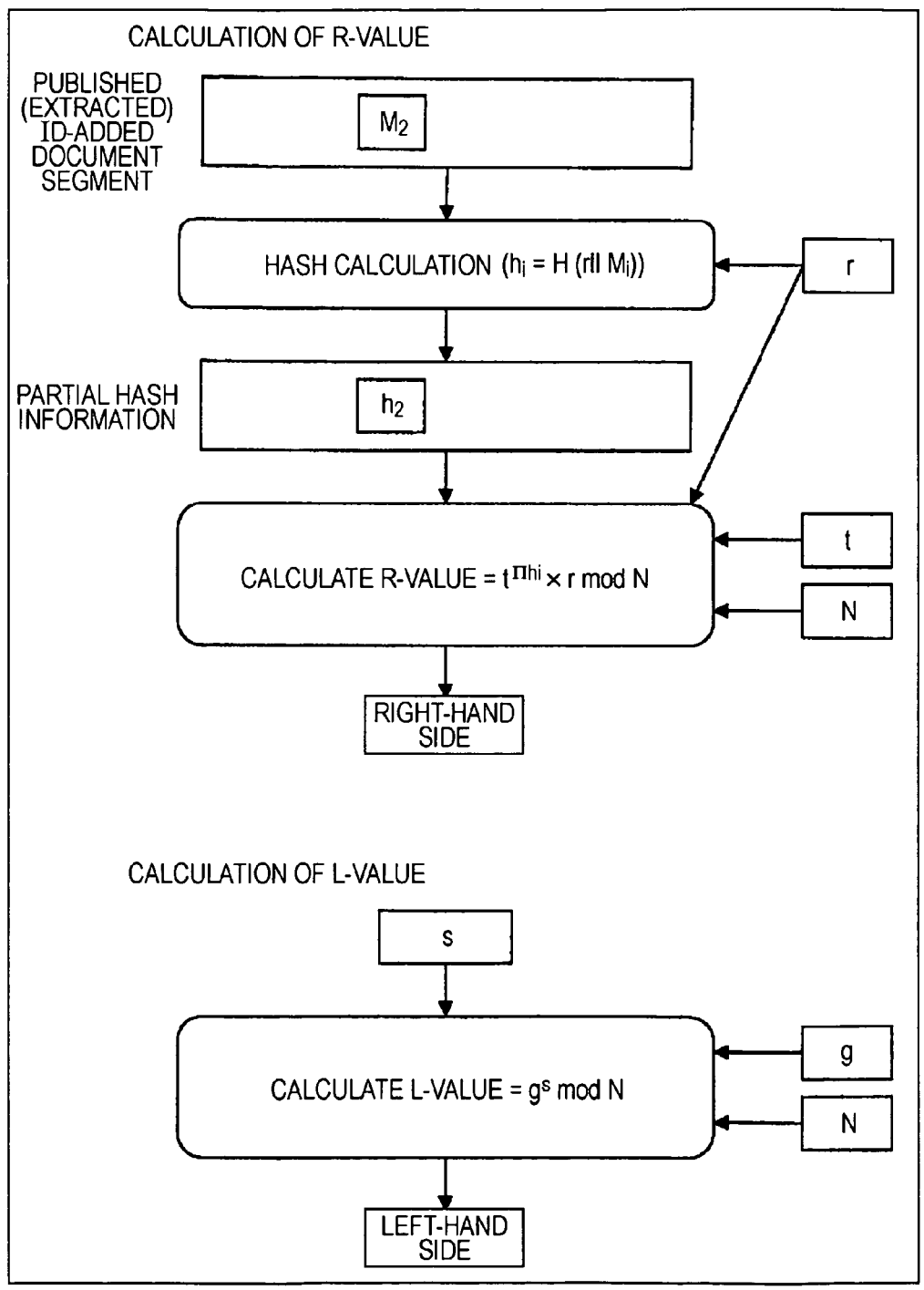
FIG. 15 is a schematic diagram showing a process of calculation of right- and left-hand sides (signature verification flow (right- and left-hand sides))
Figure 16:
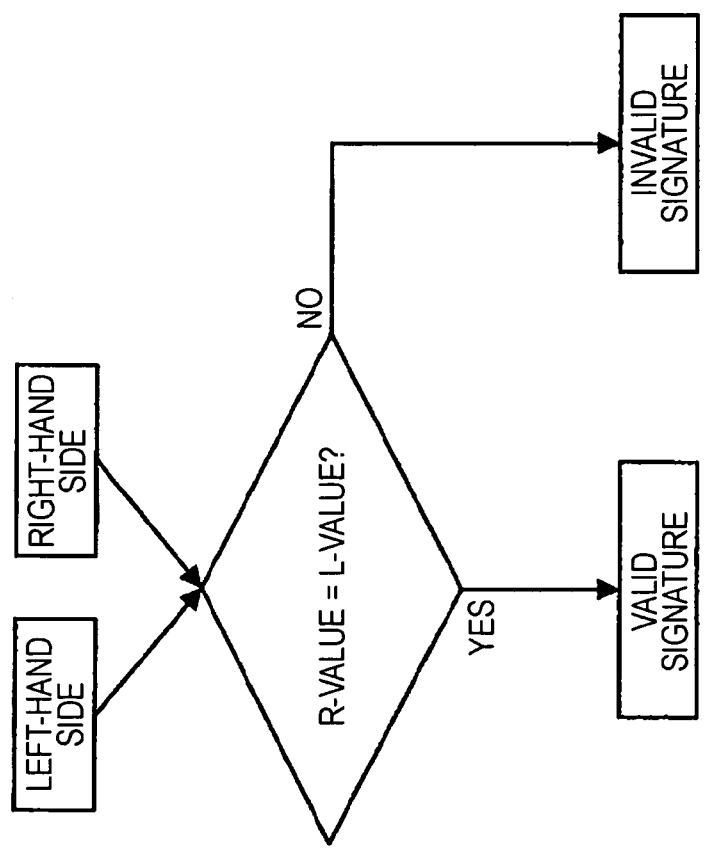
FIG. 16 is a schematic diagram showing a process of comparison between the right- and left-hand sides (signature verification flow (comparison))

FIG. 15 schematically shows the process of calculation of the R-value and L-value described above. FIG. 16 schematically shows the process of comparisons between the values of the right- and left-hand sides.

Figure 17:
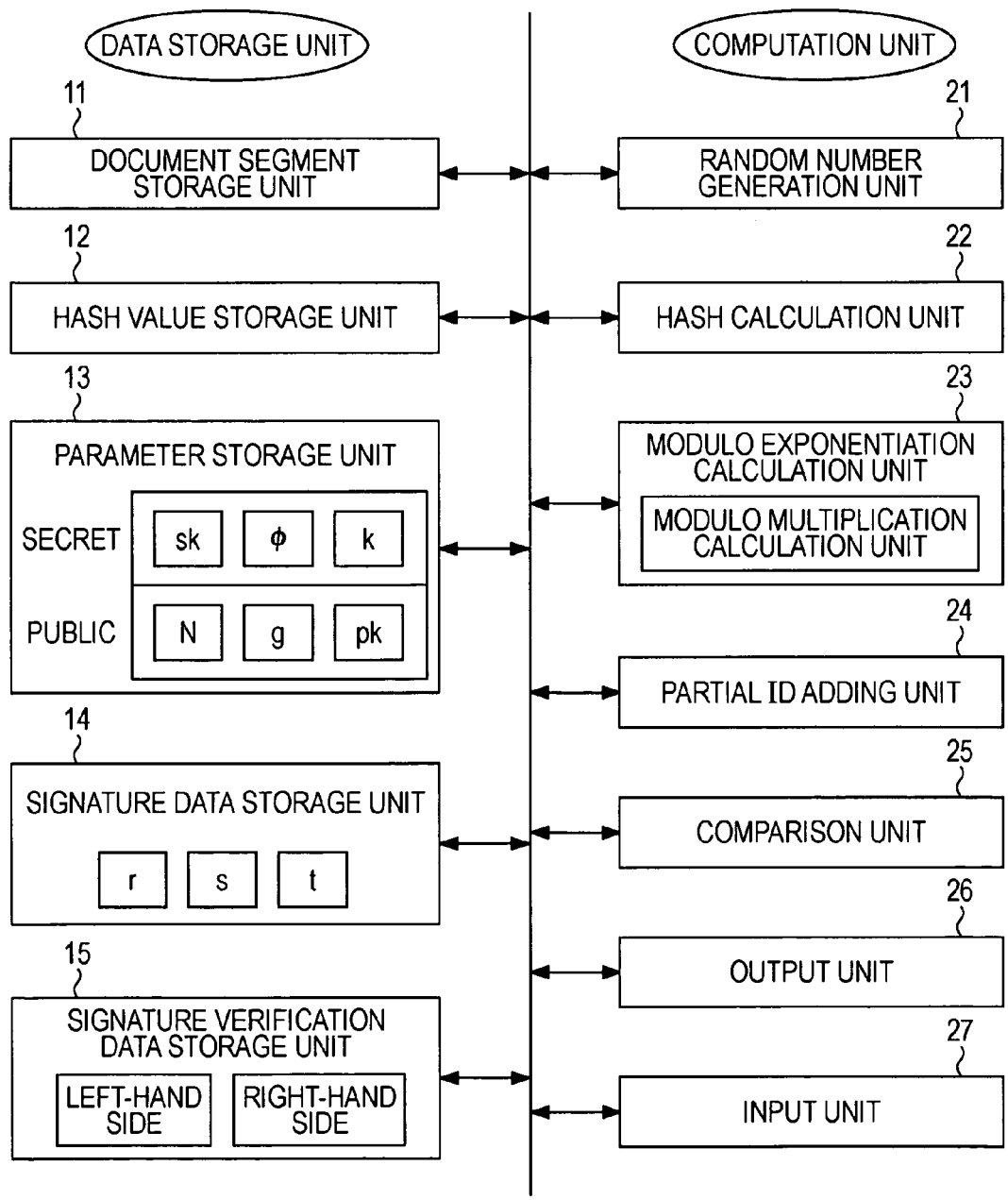
FIG. 17 is a block diagram showing a structure of a signature device for implementing the signature scheme of the present embodiment.

FIG. 17 shows a structure of a signing device for implementing a signature scheme of the present embodiment. The signature device includes a data storage unit and a computation unit. The data storage unit includes a document segment storage unit 11, a hash value storage unit 12, a parameter storage unit 13, a signature data storage unit 14, and a signature verification data storage unit 15. The parameter storage unit 13 includes a secret information storage unit and a public information storage unit. The secret information storage unit stores three parameters, sk, φ, and k. The public information storage unit stores three parameters, N, g, and pk. The signature data storage unit 14 stores three signature values r, s, and t. The signature verification data storage unit 15 stores two values, the left-hand side value and right-hand side value.

The computation unit includes a random number generation unit 21, a hash calculation unit 22, a modular exponentiation calculation unit 23, a partial ID adding unit 24, a comparison unit 25, an output unit 26, and an input unit 27. The modular exponentiation calculation unit 23 includes a modular multiplication calculation unit, and is also capable of executing only modular multiplication computation.

The document segment storage unit 11, the hash value storage unit 12, the parameter storage unit 13, the signature data storage unit 14, the random number generation unit 21, the hash calculation unit 22, the modular exponentiation calculation unit 23, and the partial ID adding unit 24 may constitute a signature generation unit of the present embodiment. The document segment storage unit 11, the hash value storage unit 12, the parameter storage unit 13, the signature data storage unit 14, the hash calculation unit 22, and the modular exponentiation calculation unit 23 may constitute a signature update unit of the present embodiment. The document segment storage unit 11, the hash value storage unit 12, the parameter storage unit 13, the signature data storage unit 14, the signature verification data storage unit 15, the hash calculation unit 22, the modular exponentiation calculation unit 23, and the comparison unit 25 may constitute a signature verification unit of the present embodiment.

First, signature issuing will be described. The signing process receives the secret information sk and φ and public information N, g, and pk of the signing process from the input unit 27, and stores the received information in the parameter storage unit 13. The signing process further receives any of document segments m1 to mn (in FIG. 10, the document segment m4), which is data to be signed, from the input unit 27, and stores the received data in the document segment storage unit 11. Then, the signing process inputs the parameter φ to the random number generation unit 21 to generate a random number k greater than 0 and less than φ, and stores the generated random number k in the parameter storage unit 13. Then, the signing process inputs the parameters g, k, and N to the modular exponentiation calculation unit 23 to calculate modular exponentiation such that r=$g^k$ mod N. The signing process stores the result in the r value of the signature data storage unit 14 (see FIG. 11). Then, the signing process copies the parameter pk to the t value of the signature data storage unit 14 (see FIG. 11). Further, the signing process inputs each document segment mi stored in the document segment storage unit 11 to the partial ID adding unit 24, adds an ID to the document segment mi to generate an ID-added document segment Mi, and stores the ID-added document segment Mi in the document segment storage unit 11 (overwrites the document segment mi with the ID-added document segment Mi). This operation is performed for all document segments.

Then, the signing process inputs the ID-added document segment Mi and the signature r to the hash calculation unit 22 to calculate a hash value hi of a combination of the ID-added document segment Mi and the signature r, and stores the result in the hash value storage unit 12. This operation is performed for all ID-added document segments Mi. Then, the signing process inputs the parameters sk, k, and φ to the modular exponentiation calculation unit 23, and sequentially inputs the hash values hi to calculate a signature $$s = sk \times \Pi hi + k \mod \phi.$$

This process may be performed by performing calculations in order such that the modulo multiplication of sk and h0 is performed first, and the modulo multiplication of the result and h1 is performed next. Then, the signature s is stored in the "s" section of the signature data storage unit 14 (see FIG. 10). Finally, the output unit 26 outputs the signature values (r, s, t) and the ID-added document segments M1 to Mn.

Next, extraction will be described. The extracting process receives the public parameters N and g of the signing process from the input unit 27, and stores the received parameters in the parameter storage unit 13. The extracting process further receives the signatures r and t among the signatures of the signing process, and stores the received signatures in the signature data storage unit 14. In addition, the extracting process receives an ID-added document segment to be deleted from the input unit 27, and stores the received document segment in the document segment storage unit 11. Then, the extracting process inputs an ID-added document segment Mi and the signature value r to the hash calculation unit 22 to calculate a hash value hi of a combination of the ID-added document segment Mi and the signature r, and stores the result in the hash value storage unit 12. This operation is performed for all document segments to be deleted.

Then, the extracting process inputs the signature t and the parameter N to the modular exponentiation calculation unit 23, and sequentially inputs the hash values hi to calculate an updated signature $$t' = t^{\prod hi} \bmod N.$$

This process may be performed by performing calculations in order such that the power of $h_{x1}$ of t is calculated first, and next the power of $h_{x2}$ of the result is calculated. Here, x1, x2, etc., denote hash values of ID-added document segments to be deleted. The updated signature t' is stored in the t value of the signature data storage unit 14, and the updated signature t' is output from the output unit 26. Alternatively, all the signatures (r, s, t) may be input and all the signatures (r, s, t') including the updated signature t' may be output.

Next, signature verification will be described. The verifying process receives the public parameters N and g of the signing process from the input unit 27, and stores the received parameters in the parameter storage unit 13. The verifying process further receives the signatures r, s, and t' updated by the extracting process from the input unit 27, and stores the received signatures in the signature data storage unit 14. In addition, the verifying process receives the extracted ID-added document segment published by the extracting process from the input unit 27, and stores the received document segment in the document segment storage unit 11. Then, the verifying process inputs an ID-added document segment Mi and the signature value r to the hash calculation unit 22 to calculate a hash value hi of a combination of the ID-added document segment mi and the signature r, and stores the result in the hash value storage unit 12.

Then, the verifying process inputs the signatures r and t' and the parameter N to the modular exponentiation calculation unit 23, and sequentially inputs the hash values hi to calculate the "right-hand side" of the updated signatures, which is given by $t'^{\prod hi}$ r mod N. At this time, the verifying process may perform calculations in order such that the power of $h_{y1}$ of t is calculated first, then next the power of $h_{y2}$ of the result is then calculated. The verifying process may finally calculate the modular multiplication of the result and r, where y1, y2, etc., denote hash values of extracted ID-added document segments. The calculated "right-hand side" is stored in the "right-hand side" section of the signature verification data storage unit 15 (see FIG. 15).

Then, the verifying process inputs the signature s and the parameters g and N to the modular exponentiation calculation unit 23 to calculate the "left-hand side", which is given by $g^s$ mod N, and stores the result in the "left-hand side" section of the signature verification data storage unit 15 (see FIG. 15). Finally, the verifying process inputs the value of the "right-hand side" and the value of the "left-hand side" to the comparison unit 25 to perform comparison therebetween. If the R-value and the L-value coincide with each other, a result indicating that a signature is valid is output from the output unit 26. If the values do not coincide with each other, a result indicating that a signature is invalid is output from the output unit 26 (see FIG. 16).

Second Embodiment

A signature scheme of the present embodiment is compared with signature schemes of the related art in terms of cutting of a moving image. The schemes of the related art are the SUMI-4 scheme disclosed in Japanese Unexamined Patent Application Publication No. 2004-364070 and a scheme (hereinafter referred to as a "moving image Partial Integrity Assurance Technology (PIAT)") for deletion of extraction information associated therewith, which is described in Japanese Patent Application No. 2007-12048. A scheme described in the moving image PIAT is used as a method of signing a moving image.

Figure 18:
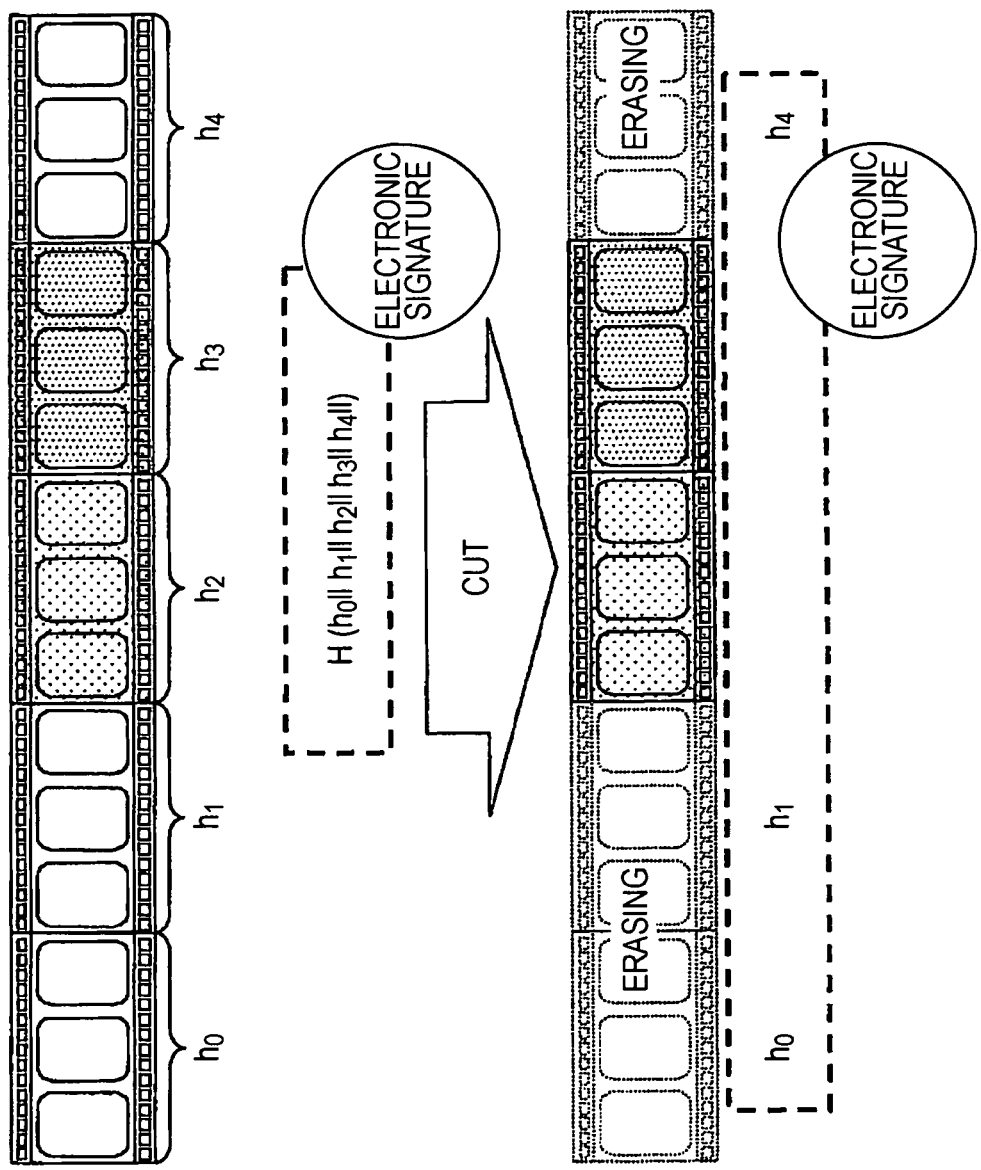
FIG. 18 is a diagram showing how a signature scheme of the related art is used for cutting a moving image (application of sanitizable signature to moving image)

As shown in FIG. 18, in a case where a moving image is signed by using the SUMI-4 scheme, only one signature is stored during signing. During extraction, a number of hash values corresponding to the number of moving image frames deleted need be stored as extraction information. In the moving image PIAT, the hash values serving as extraction information are managed using a binary tree to reduce the number of hash values to be stored.

Figure 19:
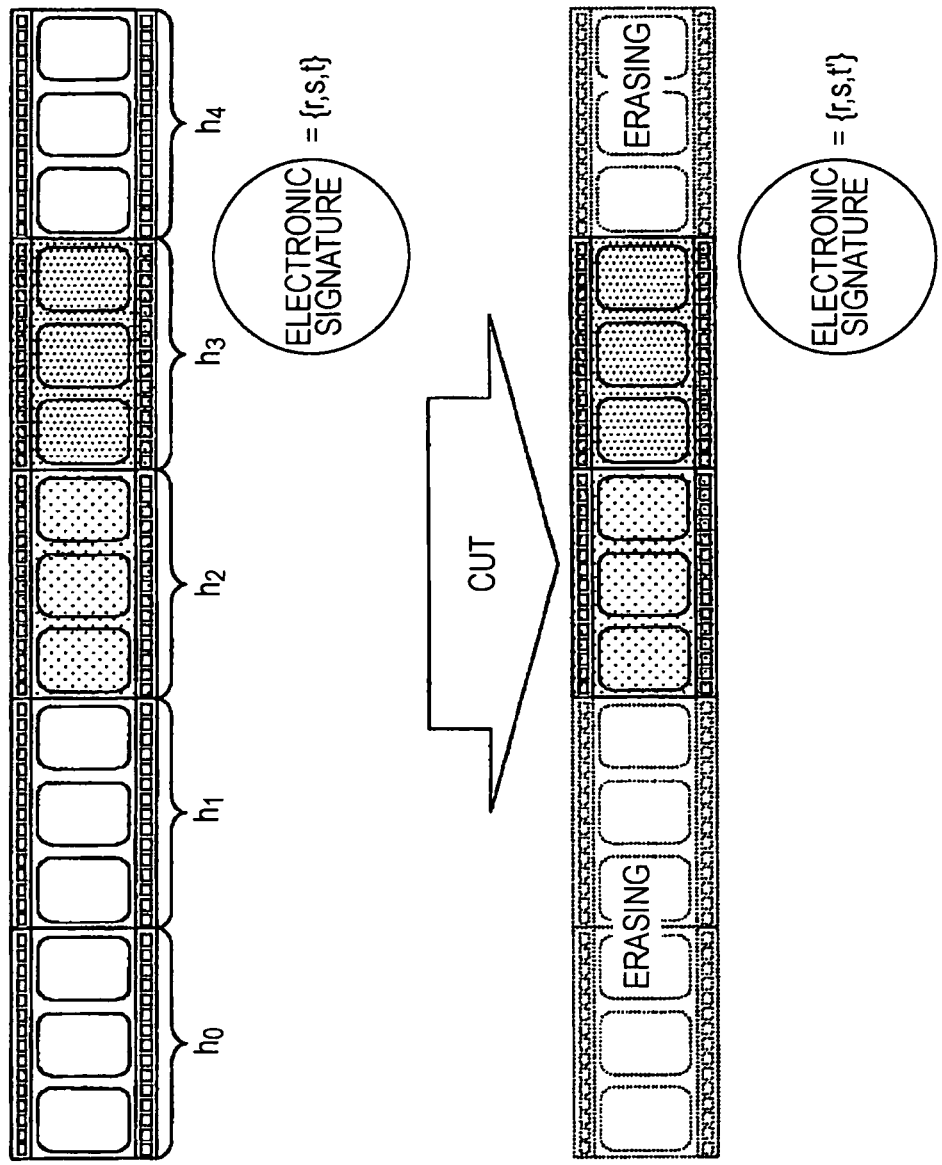
FIG. 19 is a diagram showing how the signature scheme of the present embodiment is used for cutting a moving image (application of sanitizable signature to moving image)

In the signature scheme of the second embodiment, on the other hand, as shown in FIG. 19, only signatures (r, s, t) may be stored during signing. Also during extraction, only signatures (r, s, t') may be stored and no extraction information is required.

For example, a television (TV) program is recorded for one hour at 30 frames per second, and frames corresponding to 30 minutes are extracted to perform signing so as to allow extraction on a frame-by-frame basis. The total number of frames is 108000, and 54000 frames are to be extracted. Table 1 shows the amount of data to be stored according to the respective schemes.

TABLE 1

| Technique used for extraction | The amount of data during signing | The amount of data during extraction |
| --- | --- | --- |
| SUMI-4 | 108000 document segments 1 signature | 108000 document segments + 54000 pieces of extraction information + 1 signature |
| Moving image PIAT | 108000 document segments 1 signature | 108000 document segments + up to 16 pieces of extraction information + 1 signature |
| Scheme of an embodiment of the present embodiment | 108000 document segments 3 signatures | 108000 document segments + 3 signatures |

In the signature scheme of the second embodiment, therefore, the amount of data required during extraction can be greatly reduced. Furthermore, at extraction positions, the amount of data does not change regardless of the number of frames to be extracted, thus achieving significantly simple management of signature information (including extraction information) compared with other schemes.

Third Embodiment

Figure 20:
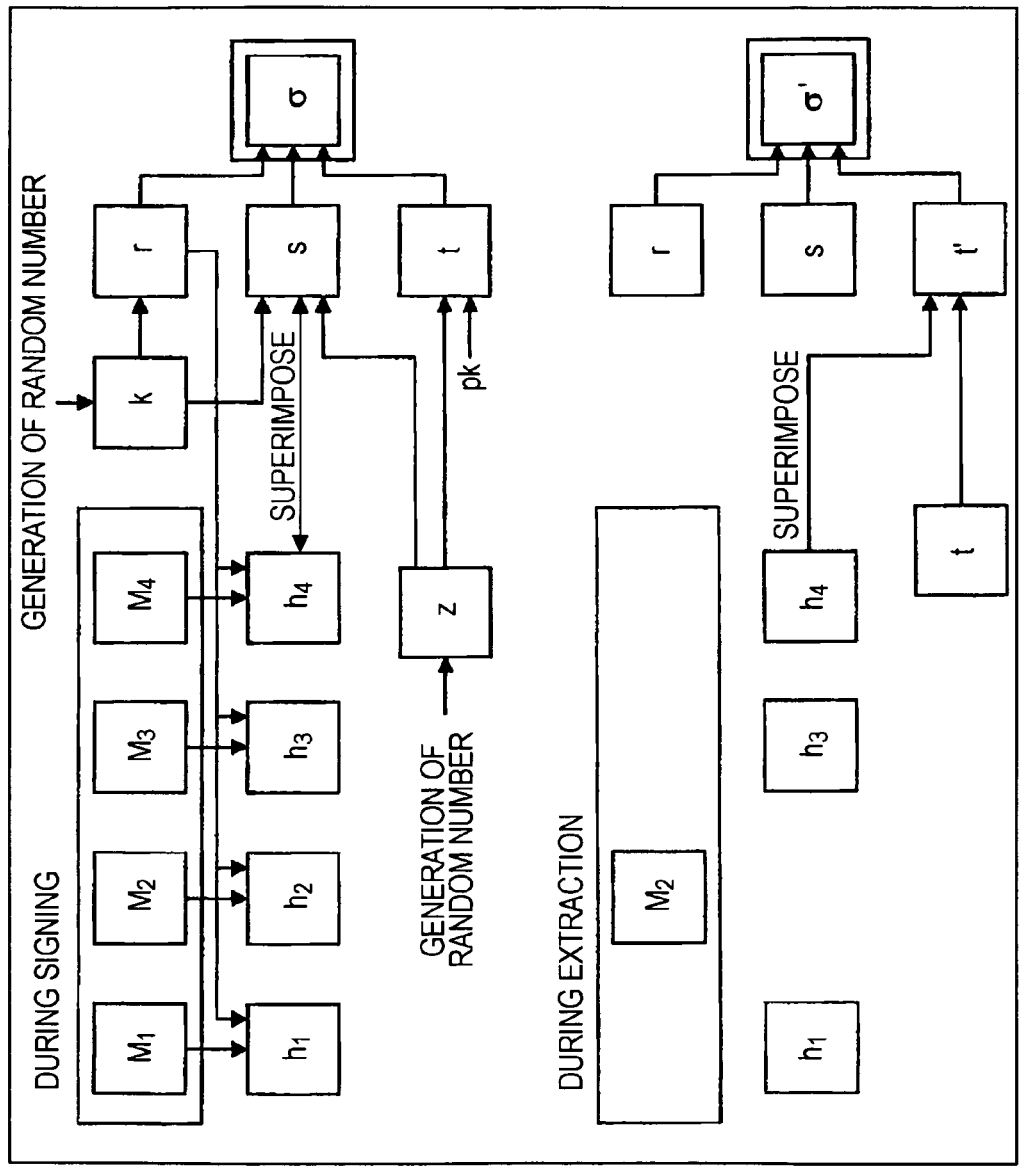
FIG. 20 is a diagram showing an overview of the signature scheme of the present embodiment in a case where a deletable signature is constructed.

An extension of the signature generation algorithm in the signature scheme of the first embodiment may easily realize a deletable signature. An embodiment including this extension will be described with reference to FIG. 20.

(1) A signing process divides a document M into n document segments $mi (0 \leq i \leq n-1)$. Then, the signing process adds document segment IDs $\{IDi(0 \leq i \leq n-1)\}$ to the document segments mi to generate ID-added document segments $Mi=ID\|mi(0 \leq i \leq n-1)$.

(2) The signing process generates a temporary secret key k using a random number less than $\phi(0<k<\phi)$. (3) The signing process generates a mask value z using a random number $(0<z<\phi)$. (4) The signing process calculates a signature value $r=g^k \mod N$ as a document ID.

(5) The signing process calculates a hash value $hii=H(r\|Mi)$ of each ID-added document segment Mi using the signature value r and a hash function.

(6) The signing process calculates a signature value $s=z \times sk \times \Pi_{0 \leq i \leq n-1} hi+k \mod \phi$, which is a body of the signature. Here, signature information of each document segment is superimposed on the signature value s in a form of $\Pi_{0 \leq i \leq n-1} hi$.

(7) The signing process prepares a signature value t for storage of deletion information, and sets an initial value thereof such that $t=pk^z$. (8) The signing process outputs an ID-added document segment set $\{Mi(0 \leq i \leq n-1)\}$ and a signature $\sigma=(r, s, t)$.

Here, it is assumed that document segment identifiers IDi are not sequential but are random numbers arranged in an ascending or descending order.

If a signature generation algorithm is defined as described above, determining information regarding the original document or document segment IDs from the updated signature t when extraction is performed is difficult. A deletable signature can therefore be constructed.

Fourth Embodiment

The signature scheme of the first embodiment is compatible with the sanitizable signature scheme. In a signature scheme of the present embodiment, instead of superimposing information regarding ID-added document segments to be deleted during extraction on the signature t, hash values of the ID-added document segments to be deleted are published to enable coexistence of a sanitizable signature and an extractable signature. Furthermore, in a case where a deletable signature is constructed in the manner described in the third embodiment, both a deletable signature and a sanitizable signature may also be established.

Fifth Embodiment

The signature scheme of the first embodiment is an extension of the Schnorr signature scheme under the RSA assumption, and secret information sk and $\phi$ and public information N and g (and pk) of the signing process are required. Therefore, by transforming current PKI information into parameters of the present scheme, the signature scheme of the present embodiment can be adopted using the current PKI.

In the current PKI, RSA cryptographic public information includes modulo N and a public key e, and secret information includes a secret key d, prime numbers p and q ($N=p \times q$) constituting the modulo N, and parameters $dp=d \mod (p-1)$, $dq=d \mod (q-1)$, and $qi=q-1 \mod p$ for high-speed computation. Here, for arbitrary data D, $D^{ed} \equiv D \mod N$ is established.

In the fifth embodiment, RSA cryptographic parameters are transformed so as to be usable for the signature scheme of the first embodiment. Since the signature scheme of the first embodiment is a signature scheme under the RSA assumption, N of RSA can be used as is. The secret information $\phi$ is the order of g but is a value defined by $\phi=LCM(p-1)(q-1)$, and can therefore be calculated from the current RSA parameters p and q. Thus, it is only required to transform sk, g, and pk from the RSA parameters.

In the signature scheme of the first embodiment, sk is an arbitrary value satisfying $0<sk<\phi$. Further, g is a generator and may have any value relatively prime to N (that is, other than p and q). The value pk is only required to satisfy the relation of $pk=g^{sk} \mod N$. On the other hand, the RSA parameters e and d have a relation of $e \times d \equiv 1 \mod \phi$ (that is, for arbitrary data D, $D^{ed} \equiv D \mod N$). If the values of the secret keys of the RSA and the signature scheme of the first embodiment coincide with each other and the values of the public keys of the RSA and the signature scheme of the first embodiment coincide with each other (that is, sk=d and pk=e), $e=g^d \mod N$, that is, $g=e^e \mod N$, is derived from pk=g sk mod N.

According to the operation described above, with the use of sk=d, pk=e, N=N, $\phi=LCM(p-1)(q-1)$, and $g=e^e \mod N$, the signature scheme of the present embodiment can be adopted using the RSA parameters of the current PKI.

According to a signature scheme of the present embodiment, an extractable signature in which the integrity of an extracted portion is ensured using a small amount of data during either signing or extraction can be achieved. The number of signatures may be fixed, such as three, regardless of the number of document segments or the number of documents extracted. Therefore, once a document is divided into small units (for example, byte units) during signing and is signed, the document can be extracted at any size.

For example, in a case where 50 document segments are to be extracted from 100 document segments, in an implementation using a sanitizable signature scheme of the related art, 101 data items are required during signing and 101 data items are required during extraction. In an implementation using a deletable signature scheme of the related art, 201 data items are required during signing and 101 data items are required during extraction. In a signature scheme of the present embodiment, on the other hand, 103 data items are only required during signing and 53 data items are only required during extraction, which is about half of that in the schemes of the related art. This effect becomes more noticeable when the number of document segments increases or the number of document segments extracted decreases.

Programs for causing a computer to execute operations described in flowcharts or steps illustrated in the foregoing embodiments can be provided to provide a signature program of the present embodiment. Such programs can be recorded on computer-readable media and can be executed by a computer. The computer may include a host device such as a personal computer, a controller of a test device, and a controller such as a micro-processing unit (MPU) or a central processing unit (CPU) of a storage device. Examples of computer-readable media include portable storage media such as a compact disc read only memory (CD-ROM), a flexible disk, a digital versatile disk (DVD), a magneto-optical disk, and an integrated circuit (IC) card, databases storing a computer program, other computers, databases thereof, and transmission media on networks.

What is claimed is:

1. An electronic signature method executed by a computer, the electronic signature method comprising:
    dividing a target electronic document into a plurality of document segments;
    generating a signature (s, t) that includes a set of two values having a signature value s forming a signature on the electronic document and a deletion signature value t used for deletion, the signature value s, which serves as a body of the signature, being formed by a superposition of signature information on the individual document segments; and superimposing, in a case where one of the plurality of document segments obtained by the division is to be extracted, deletion information of a document segment to be deleted on the deletion signature value t to generate a new signature value t', and producing an updated signature (s, t').

2. The electronic signature method according to claim 1, further comprising:

performing signature verification based on a hash value of the extracted document segment and the updated signature (s, t').

3. The electronic signature method according to claim 1, further comprising:

generating the signature value s serving as a body of the signature of the electronic document using two values having a signature value r used as a document identifier and a signature value s1 serving as a body of the signature; and wherein the generating of the signature (s, t) generates a set of signatures (r, s1, t) including a set of three values having the signature value r used as a document identifier, the signature value s1 serving as a body of the signature, and the deletion signature value t, the signature value s1 serving as a main portion of the signature being formed of a superposition of signature information about the individual document segments, and wherein the producing produces an updated signature (r, s1, t').

4. The electronic signature method according to claim 3, further comprising:

performing signature verification based on a hash value of the extracted document segment and the updated signature (r, s1, t').

5. The electronic signature method according to claim 3, further comprising:

calculating the signature value r used as a document identifier from a public key of a signing process and a secret key of the signing process.

6. The electronic signature method according to claim 3, further comprising:

generating a secret key from a random number k generated by the signing process.

7. The electronic signature method according to claim 6, further comprising:

calculating the signature value $r=g^k$ mod N, where N is a product of two prime numbers p and q, and g is a generator relatively prime to N, N and g being public keys of the signing process and the random number k being the secret key, the random number k being less than an order $\phi$ of the generator g, where $\phi=LCM(p-1)(q-1)$.

8. The electronic signature method according to claim 7, further comprising:

performing signature verification by comparing a value of a right-hand side calculated from the signature value t', the public key N, and a hash value hi of an extracted identifier-added document segment, the right-hand side being given by $t'^{|hi|}r$ mod N, with a value of a left-hand side calculated from the signature value s and the public keys g and N, the left-hand side being given by $g^s$ mod N.

9. The electronic signature method according to claim 8, further comprising:

outputting a result indicating that the signature is valid when the value of the right-hand side and the value of the left-hand side coincide with each other, and a result indicating that the signature is invalid when the value of the right-hand side and the value of the left-hand side do not coincide with each other.

10. The electronic signature method according to claim 1, further comprising:

calculating the signature value s serving as a body of the signature using a mask value z generated by using a random number to realize a deletable signature.

11. The electronic signature method according to claim 1, further comprising:

publishing a hash value of the document segment to be deleted, instead of superimposing the deletion information of the document segment to be deleted during extraction of a document segment on the deletion signature value t, to realize a sanitizable signature.

12. A non-transitory recording medium having an electronic signature program recorded thereon, the electronic signature program causing a computer to execute an electronic signature process comprising:

dividing a target electronic document into a plurality of document segments;

generating a signature (s, t) that includes a set of two values having a signature value s forming a signature on the electronic document and a deletion signature value t used for deletion, the signature value s which serves as a body of the signature being formed by a superposition of signature information on the individual document segments; and superimposing, in a case where one of the plurality of document segments obtained by the division is to be extracted, deletion information of a document segment to be deleted on the deletion signature value t to generate a new signature value t', and producing an updated signature (s, t').

13. An electronic signature device comprising:

a memory that stores a program including a procedure; and a processor that executes the program, the procedure comprising:

dividing a target electronic document into a plurality of document segments, generating a signature (s, t) that includes a set of two values having a signature value s forming a signature on the electronic document and a deletion signature value t used for deletion, the signature value s which serves as a body of the signature being formed by a superposition of signature information on the individual document segments, in a case where one of the plurality of document segments obtained by the division is to be extracted, superimposing deletion information of a document segment to be deleted on the deletion signature value t to generate a new signature value t', and producing an updated signature (s, t').

14. The electronic signature device according to claim 13, further comprising:

performing signature verification based on a hash value of the extracted document segment and the updated signature (s, t').

* * * * *